US007233795B1

(12) United States Patent
Ryden

(10) Patent No.: US 7,233,795 B1
(45) Date of Patent: Jun. 19, 2007

(54) LOCATION BASED COMMUNICATIONS SYSTEM

(76) Inventor: Michael V. Ryden, 62290 Jay Jay Rd., Montrose, CO (US) 81401

( * ) Notice: Subject to any disclaimer, the term of this patent is extended or adjusted under 35 U.S.C. 154(b) by 138 days.

(21) Appl. No.: 10/101,841

(22) Filed: Mar. 19, 2002

Related U.S. Application Data

(60) Provisional application No. 60/277,117, filed on Mar. 19, 2001.

(51) Int. Cl.
*H04Q 7/20* (2006.01)
(52) U.S. Cl. ..................................... 455/445
(58) Field of Classification Search ............... 455/445
See application file for complete search history.

(56) References Cited

U.S. PATENT DOCUMENTS

| | | | |
|---|---|---|---|
| 5,448,623 A | 9/1995 | Wiedeman et al. | 379/59 |
| 5,890,092 A | 3/1999 | Kato et al. | 701/216 |
| 5,946,618 A | 8/1999 | Agre et al. | 455/428 |
| 5,995,041 A | 11/1999 | Bradley et al. | 342/357 |
| 6,002,363 A | 12/1999 | Krasner | 342/357.1 |
| 6,028,514 A | 2/2000 | Lemelson et al. | 340/539 |
| 6,041,222 A | 3/2000 | Horton et al. | 455/255 |
| 6,044,257 A | 3/2000 | Boling et al. | 455/404 |
| 6,061,561 A | 5/2000 | Alanara et al. | 455/422 |
| 6,064,336 A | 5/2000 | Krasner | 342/357.05 |
| 6,067,082 A | 5/2000 | Enmei | 345/174 |

*Primary Examiner*—William D. Cumming
(74) *Attorney, Agent, or Firm*—Allen H. Erickson

(57) ABSTRACT

A location based communications system uses a physical location system (PLS) or relative position system to determine a communication unit's location in two or three dimensions, and is configured for radiotelephonic calls through intermediary communications satellite systems, cellular systems or other mobile systems and land line systems, based on the location G# of the called telephone or on a caller-defined estimated area or space termed a G zone number GZ# surrounding the desired callee. The system is particularly advantageous for mobile communications, and may be interfaced with conventional stationary telephones, cellular phones and other communications devices. Multiple telephone units may be simultaneously contacted with messages in user-defined languages. Emergency features enable the location based communication system to locate and notify the nearest and/or best equipped party for assistance in the event of an emergency, issue warnings to all phones in a specific area of any size, calculate vehicle velocities and control traffic.

31 Claims, 13 Drawing Sheets

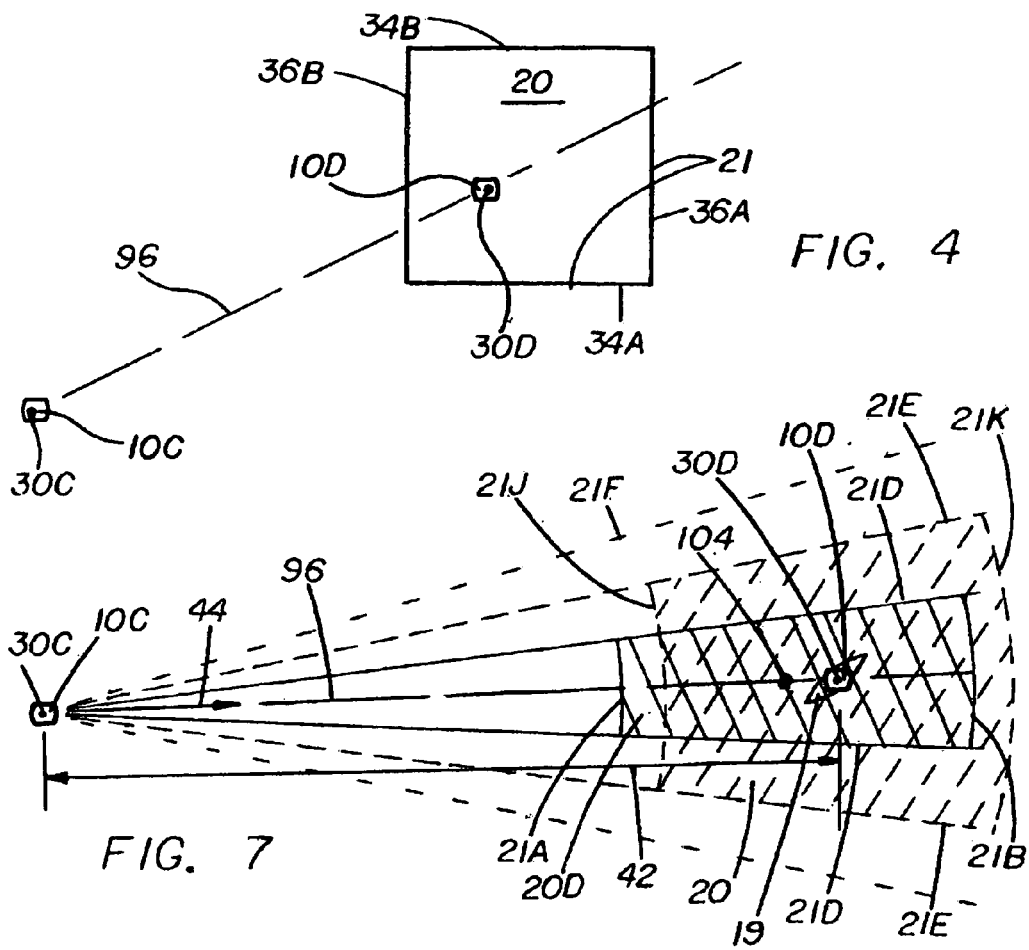
FIG. 4
FIG. 7
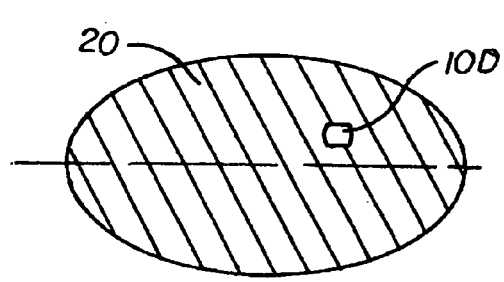
FIG. 5
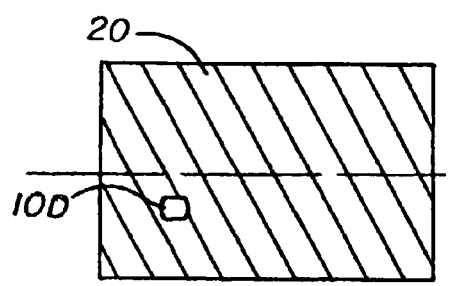
FIG. 6

LOCATION BASED COMMUNICATIONS SYSTEM

FIELD OF THE INVENTION

The present invention relates generally to communications systems. More particularly, the invention pertains to apparatus and methods for enhanced local and wide-area communications between stationary and/or roving communications units on land, at sea, underwater, underground and in the air.

BACKGROUND OF THE INVENTION

A variety of wireless communications systems are used to provide voice and data transmission to and from subscriber telephonic units within a prescribed geographic area. Analog cellular systems such as those designated as AMPS, ETACS, MMT-450 and MMT-900 have been deployed throughout the world. Subsequently, digital cellular systems have become common, and include the so-called personal communications system (PCS) including those denoted as IS-95m OCS-1900, PACS, DCS-1800, DECT, PHS and other names. PCS systems generally utilize a radio frequency band of about 2 gigahertz (Ghz) for both voice and data transmission.

In a conventional terrestrial wireless communication system, wireless mobile terminals, i.e. cellular phones may communicate with a plurality of cells served by base stations and a mobile telephone switching office. Communication is enabled between mobile telephones and between a mobile telephone and a land line terminal, e.g. conventional telephone or computer.

Celestial wireless communications systems are known, and comprise typically a plurality of earth satellites that serve as transponders or relays for radio communications between earth stations and wireless satellite mobile terminals. Such cellular systems may utilize a single antenna beam covering the entire area served by the system, or alternatively, the system may produce multiple beams (with minimal overlap), each beam serving a distinct geographic coverage area within the service region. Thus, a satellite and beam coverage serve the same purpose as a base station and a cell of a non-satellite cellular communications system.

Various systems for locating one's earth position are in place including the well-known Global Positioning Satellite System (GPS). In this application, electronic position locating systems will be referred to generically as physical location systems (PLS) of which GPS is one version.

Various methods and apparatus for integrating a physical location system (PLS) such as a global position satellite system (GPS) with a satellite communications system are described in the patent literature, as noted below.

In U.S. Pat. No. 5,448,623 of Wiedeman et al., a satellite communications system is disclosed having a network of gateways which interface with a terrestrial communications system.

U.S. Pat. No. 5,946,618 of Agre et al., describes a mobile telephone system employing a fleet of communications satellites and a set of gateway ground stations arranged around the globe for handling communications to and from mobile subscriber units. The location of a mobile unit is determined using a GPS satellite system, and the mobile unit transmits the location to a gateway. The disclosure presents methods for selecting which service provider will handle a call made by a mobile unit, and ways for directing emergency calls to the proper authorities. In addition, methods for handling a mobile unit call to a nearby phone which is far distant from the calling unit's home area are disclosed, wherein the call is handled as a local call irrespective of whether a long distance area code or trans-country prefix is dialed.

U.S. Pat. No. 5,995,041 of Bradley et al. discloses a satellite phone for direct communication with a communications satellite system. The phone may be stationary or mobile, and generates a highly directed antenna beam which is continuously controlled regardless of the position of the phone, using GPS determined coordinates of both the phone and a communications satellite.

In U.S. Pat. No. 6,028,514 of Lemelson et al., a system is described for monitoring a person's location. A few standardized warning messages may be transmitted to the person, and a few emergency messages may be transmitted from the person's unit to a command center. The person's location is calculated from GPS signals, and the communications are transmitted via a terrestrial cellular system or via communication satellites.

U.S. Pat. No. 6,041,222 of Horton et al. describes a wireless mobile terminal having a communication transceiver and a GPS transceiver. The two transceivers share a common frequency reference signal which is used for signal demodulation and processing. The reference indicates utility in an advanced "911" system whereby an emergency call by e.g. an accident victim would include the GPS location of the victim. It is also indicated that radio communications from a communications satellite could be highly directed (in "pencil beams") if the mobile terminal's location is accurately known. This would save considerable transmission energy.

In U.S. Pat. No. 6,064,336 of Krasner, a GPS receiver having a communications link is described. A precision carrier frequency is used to calibrate the local oscillator such that its output is modified by a reference signal generated from the precision carrier frequency signal. More particularly, satellite almanac data are transmitted to a remote GPS receiver unit from a base station. The remote GPS receiver unit uses the almanac data to determine approximate Doppler data for the satellite in the "view" of the receiver unit.

As described in U.S. Pat. No. 6,061,561 of Alanara et al., a mobile station within the geographic limits of a "cell" receives a signal from the cellular base station indicating the location of the base station. The location data are stored in the mobile station and transmitted in calls made therefrom.

In U.S. Pat. No. 6,002,363 of Krasner, a cellular mobile unit is disclosed which has a GPS receiver for determination of the unit's location. The circuitry for GPS receiving/calculating operations and cellular communications operations are shared, requiring that both operations cannot be used simultaneously.

U.S. Pat. No. 5,890,092 of Kato et al. describes a navigation system for vehicles wherein direction of movement (heading) is calculated using a geomagnetic sensor, steering sensor, gyro, or the like. The heading data is combined with GPS position data to determine the route and velocity of a vehicle.

As disclosed in U.S. Pat. No. 6,044,257 of Boling et al., a "panic button" cell phone may be activated to receive GPS signals and calculate its position. The phone may be used to call to an emergency response center (ERC) which is given the phone's position. In addition to a sound alarm, a low-range radio may be used to activate a household alarm system.

A cellular communications device is described in U.S. Pat. No. 6,067,082 of Enmei in which its position is calculated from GPS signals, and transmitted in communications (voice, facsimile and data) made from the device.

In the current state of the art, each cellular telephone unit has a unique identification code. Radio signals (initiated by other units) which present that code will initiate a response from the called unit, as long as the called unit is "switched ON" and is within radio range to receive the radio signals. Cellular telephone communication with ships at sea is non-existent unless the ship is in port or near land having a nearby cellular tower.

Currently, radio communications at sea require a person to maintain a radio ON and listen to various parties communicating on the same channel. In proper use, the radio must be kept ON and audible. Because it is tiresome to continuously listen to conversation which is not specific to the listener's vessel, radios are generally ignored, and often are turned OFF. Thus, a call from another vessel is unsuccessful. Often, distress (SOS) transmissions from nearby ships or boats are missed, and the vessel passes the troubled ship without any knowledge of the emergency situation. Plans are underway to abandon the present maritime communications system in the near future because of these and other inherent problems. In a proposed system, a ship in trouble may dial a sighted vessel (if its "telephone" number is known), and an emergency button may be activated to radio-transmit the GPS position of the calling "phone" and a MayDay Message to the sighted vessel. Only short range "line-of-sight"VHF radio is in view, and the phone number of the rescue vessel must be known. Thus, a satisfactory and comprehensive communications system for providing enhanced safety considerations has not yet been announced.

SUMMARY OF THE INVENTION

A communications system for alleviating the above indicated shortcomings has been discovered. The present invention comprises a communication system which may be integrated with current telephonic systems, e.g. hard-wired, cellular, and/or satellite, or may be used as a partial or complete replacement for current methods of initiating and maintaining telephonic (voice, facsimile, data, e-mail, etc.) communications between parties. The basic concepts and hardware of the invention may be adapted for use with any method of electronic communication known to the inventor, including radio or sonic underwater communications. The apparatus of the invention may be considered as a call origination communications unit (such as a telephone or computer), at least one call receiving communications unit (again, as a telephone or computer) and an intermediary processing system which provides the apparatus and software for handling the call initiation, communications maintenance, memory, disconnection, accounting and the like. The communications may "ride" on an EMF (electromagnetic force, frequency or wave) such as radio, and sonic forward progression molecular compression waves. The transmission medium may be any wave which may be adapted to carry a transmission between distant locations including a machine-receivable message.

In its simplest embodiment, the invention comprises a method and apparatus for initiating and continuing communication, including conversation, between distant parties though neither party knows that the other party even exists. In the broadest sense, the invention requires a matrix for identifying any particular location in three dimensional space for the particular region to which the invention is to be applied. Thus for example, when applied to a globular surface such as the earth, the physical location identification system (PLS) may utilize latitude and longitude as two dimensions, and distance from the earth's center as a third dimension. Such a system will include locations both above and below the earth's surface. Arbitrarily, the third dimension may be defaulted to comprise the earth's surface, or alternatively to a value of altitude above the earth's surface, or above mean sea level, or below using negative values, thus eliminating sub-surface locations from the system. A location on the earth's surface (default third dimension) may thus be identified by two dimensions (two factors) and considered to be a "two-dimensional" location for calculation purposes. Although the invention may be adapted for universal use, it will be illustrated herein in relation to the earth's surface or a portion thereof, to airspace, to underwater use, to local intercommunications such as shipboard, and the like. The matrix of physical locations may be configured to be "relative", e.g. based on the location of the calling telephone unit, even if the unit is moving at high speed relative to the earth.

The invention requires (1) a system for identifying the geographic location of a telephonic unit, e.g. a physical position location system (PLS) or data base and (2) a system for message transmission. While various systems of each type may be used, the invention will be illustrated and exemplified herein by use of a PLS system such as those which use global positioning satellites (GPS), and radio-telephone transmission through a network of communications satellites (CS).

In this location-based communications system, a phone is located and called by its geographic location, or a limited area or space having boundaries which enclose the specific geographic location of the called phone. This is contrary to the current system using a conventionally assigned telephone number for example having at least some of a country code, an area code, a local prefix and a plural-digit number (four digits in the United States) which identify the particular telephone unit.

In a location-based communications system of the invention, each mobile unit has apparatus for determining its earth location in a matrix of at least two dimensions, e.g. latitude and longitude, and preferably including a third dimension, e.g. altitude. To initiate a call from a first telephone unit to a second telephone unit, the geographic earth location (called G# herein) of the second telephone unit (more precisely, the PLS antenna of the unit) may be identified in the call initiating process. While it is generally preferred that the PLS antenna is physically attached to a telephone unit, it may optionally be located remotely from the unit, particularly where the location of the telephone unit prevents good reception of its earth location. Some units may be assigned a specific G#, even though the unit itself is not at that location. Earth location or communication matrices other than altitude-longitude-elevation may be used, as will be discussed, infra.

Preferably, the initiating call from the first telephone unit is directed (e.g. through a communications transceiver on a satellite or cellular system) to include a two-dimensional area or a three-dimensional space having boundaries within which the G# (i.e. location) of the second telephone unit is located. This area or space is called herein a Geographic Zone or GZ for short, and has a brief numeric or alpha-numeric electronically transmittable code defining the limits of the GZ. The call-initiating telephone unit may be conventionally hard-wired or wireless, and the location based communications system may include ground lines between individual telephone units, satellite gateways, cellular gateways, and other gateways e.g. to an underwater communications system.

An initiating telephone call will preferably include the G# of the calling telephone unit, a billing number, e.g. a conventional telephone number, and a definition of the area within which a desired called telephone unit is located, e.g. a GZ#. The initiating call is transmitted to an intermediary communications system including for example, a direct telephone system, a communications satellite, cellular telephonic system, underwater communications system or local cellular (mini-cell) system, for example, and rebroadcast to an area or three-dimensional space which, at minimum, encloses the G# of the desired called telephone unit The called telephone unit receives the initiating call, compares the called geographic definition with its own location. If there is agreement, the called telephone unit will signal that it has received a call, and an ANSWER command may be entered by its user (or an automatic response may initiated by the unit) to complete the connection and begin communication. A call signal to a user may be by a sound signal (e.g. ringer), a lighted lamp, vibrator, or other attention-getting devices which interrupt personal radio or television programming, for example.

The location G#s of all existing stationary telephone units (or the building entry boxes therefor) are currently known (in the United States at least), or may be readily determined by use of a GPS receiver, for example. Since a telephone unit is identified by its location, stationary telephone units will have permanent G#s in the system's memory. On the other hand, the G# of a mobile telephone unit will vary as the location of the unit changes. The current location of a mobile telephone may be determined using any available method which may be incorporated into a practical mobile phone, but preferably uses global position signals from a PLS satellite(s) or a cellular telephone system. A preferred embodiment will be capable of receiving position signals from an orbiting PLS satellite system, as well as voice, data and/or facsimile signals and the like to/from an orbiting communications satellite system. Any type of digital or analog-coded message which is capable of wireless transmission may be used in this invention.

The invention also encompasses methods and apparatus for operating the location based communication system, particularly in marine communications and the like. Methods and apparatus for calling a sighted (but unidentified) ship(s) in a marine emergency are disclosed Methods for discriminating between a plurality of telephone units within a called GZ are presented. Also, methods for issuing telephonic warnings or other messages to all persons with communications units in a specified area or space of any definable size e.g. a building, city block, city, county, specified airspace, etc. are described. The communications units may include "telephonic" units, LAN computers, Web-attached computers, and various other devices which are capable of receiving and responding to signals. Applications of the invention to correct traffic problems and for law enforcement are described. In addition, use of the concept to maintain a knowledge of the location of another person (a child for example) is noted. Many other applications will be evident from the following drawings and description.

BRIEF DESCRIPTION OF THE DRAWINGS

FIG. 4 is a top view of a calling telephone unit and a called telephone unit, the latter having a geographical zone surrounding the telephone unit and useful for initiating a call to the called telephone unit in accordance with the invention;

FIG. 5 is a top view of another geographical zone having a different shape, in accordance with the invention;

FIG. 6 is a top view of a further geographical zone having another shape, in accordance with the invention;

FIG. 7 is a top view of a user defined geographical zone for calling a telephone unit estimated to be within the geographical zone, in accordance with the invention;

DETAILED DESCRIPTION OF THE PREFERRED EMBODIMENTS

Figure 1:
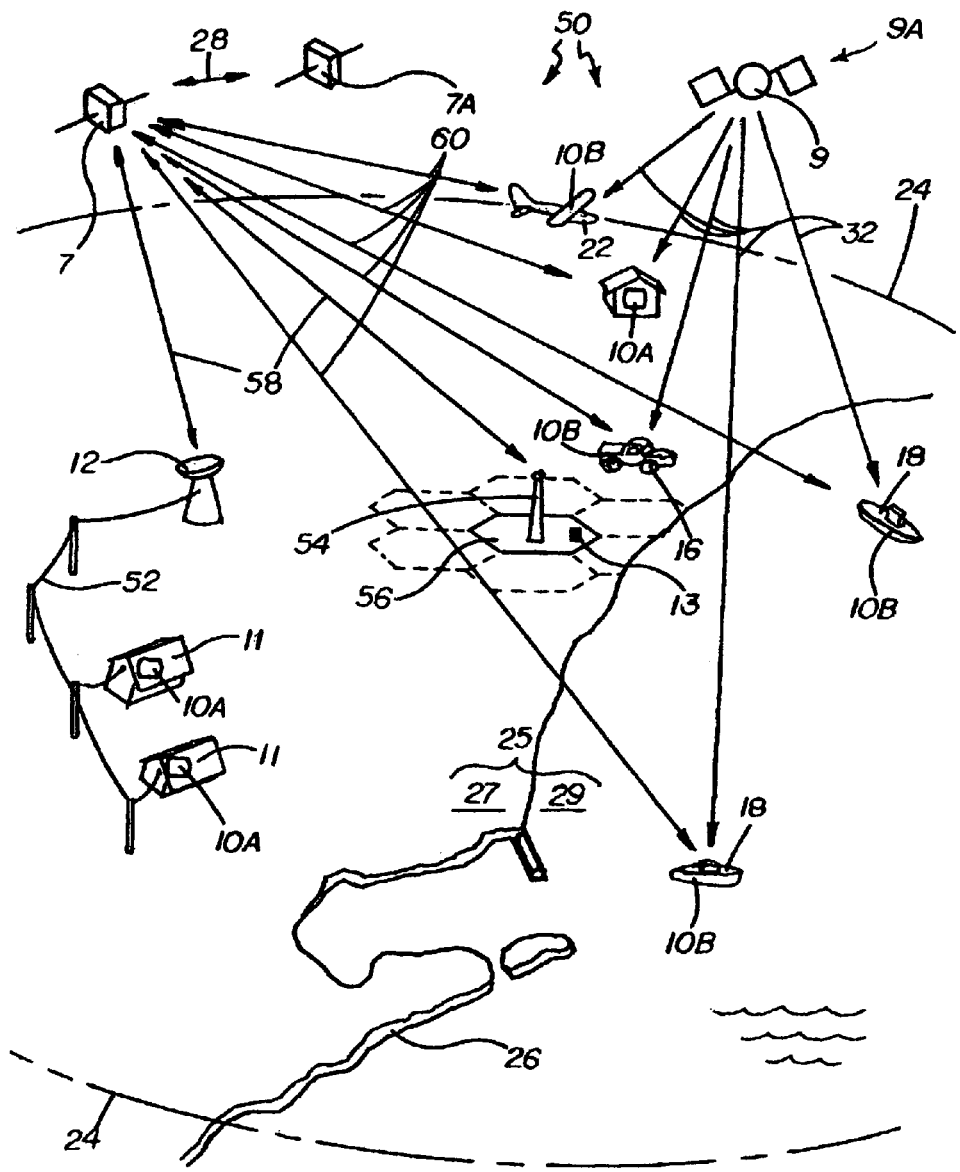
FIG. 1 is a figurative illustration of an exemplary location-based communications system which is constructed and operated in accordance with the present invention.

The present invention will now be described more fully hereinafter with reference to the accompanying drawings, in which examples and preferred embodiments of the invention are shown. However, this invention may be embodied in many different forms and should not be construed as limited to the exemplary embodiments set forth herein. Rather, these embodiments are provided so that this disclosure will be thorough and complete, and will convey the scope of the invention, including equivalents, to those skilled in the art. Like numbers refer to like or equivalent elements throughout.

In this application, the term "physical location system" or "PLS" 9A is used in a generic sense to denote any method for rapid determination of the earth or space position G# 30 of a telephone unit 10. The PLS 9A may comprise a satellite 9 or fleet of satellites which emit radio signals usable by a receiving unit to determine its position G# 30. e.g. latitude 34 and longitude 36 and preferably altitude 38 (or radial distance above the earth's center) as well (such as of airplane 22). A PLS satellite is denoted in FIG. 1 by the numeral 9. The system known as Global Positioning Satellite System (GPS) is a particular PLS system 9A in wide use by U.S. customers and the U.S. military, and covers a large portion of the earth's surface 25. The invention will be described herein as utilizing a GPS system denoted by the numeral 9A. Alternatively, the PLS 9A may comprise a location determining system 80 using differential transmission times to a plurality of earth-bound cellular towers (not shown) as currently known, to pinpoint the location of a communications unit 10, e.g. wireless telephone. Furthermore, the PLS 9A may determine a "relative" position, i.e. a position encompassing or relative to an object other than the earth. For example, a PLS 9A may be designed to comprise a location G# 30 within or on, for example a building, a ship, a municipality, etc., and the location may be specified in any type of three-dimensional matrix 31. One (or even two) of the dimensions 34, 36, 38 may be a default location such as sea level, ground level, etc. In any case, the location G# 30 of a communications unit 10 will be expressed in terms of a matrix 31 encompassing the object or surface of interest, whether it is the entire universe, the earth's surface, the earth and its surrounding space, a city, a building or a ship for example. A matrix 31 encompassing underwater environs may be formed through the use of sonic signals (not shown) transmitted by a communications unit 10 and detected by two or more sensors stationed underwater or suspended from a ship. In the former case, the matrix 31 will be relative to the sensors, while in the latter case, the matrix will be relative to the ship, which may be continuously in motion.

The term "communications satellite" or "CS" 7 denotes one or more earth satellites which act as transceivers to relay telephone calls 23 between individual telephone units 10 or between a telephone unit and a gateway station 12 or another satellite by "handing-off" 28. A communications satellite CS will be identified herein by the numeral 7 or 7A. It should be noted that for at least land-based communications, a cellular system (not shown) may be used in lieu of communications satellites CS 7, 7A.

Figure 2:
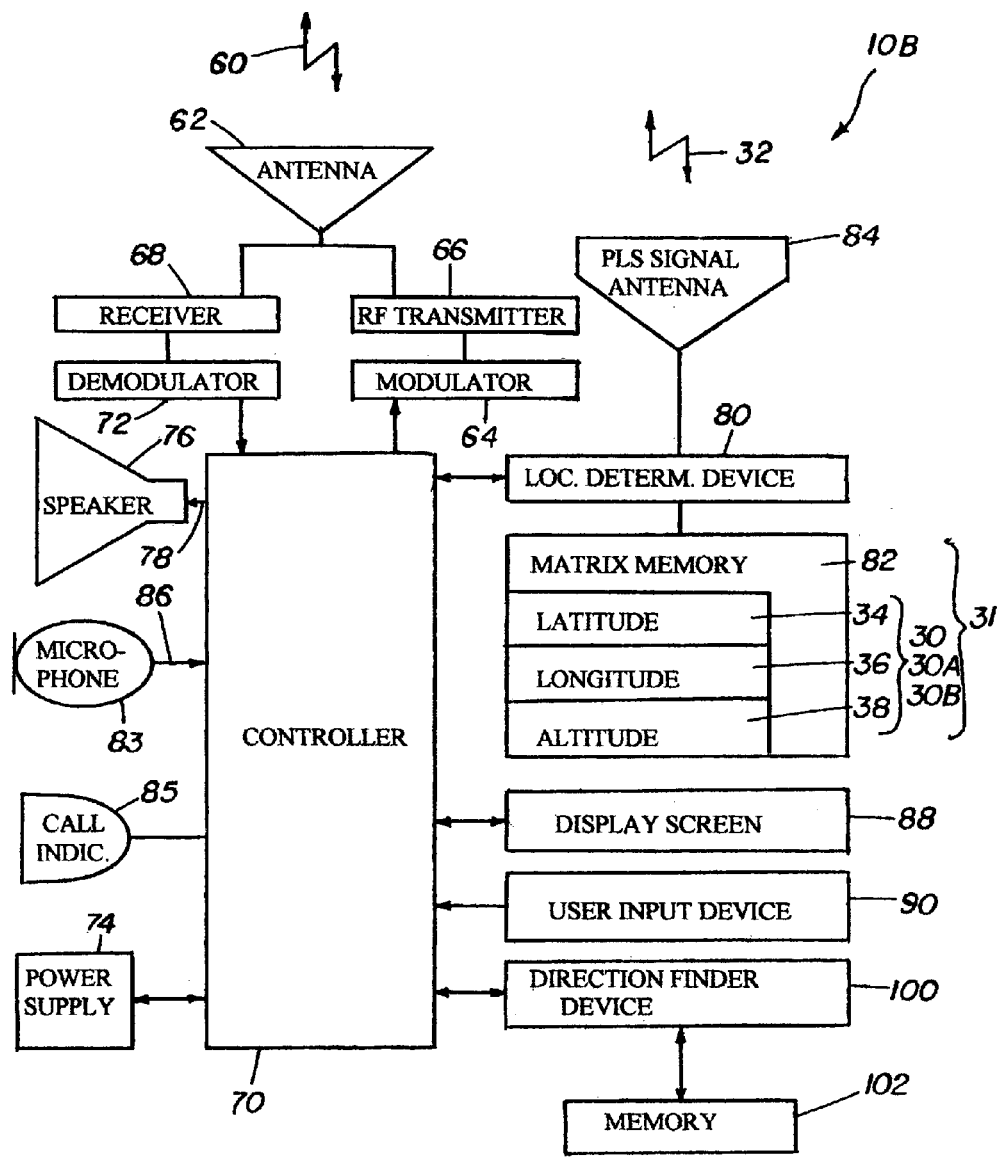
FIG. 2 is a block diagram of the components of an exemplary telephone unit in accordance with the present invention.
Figure 3:
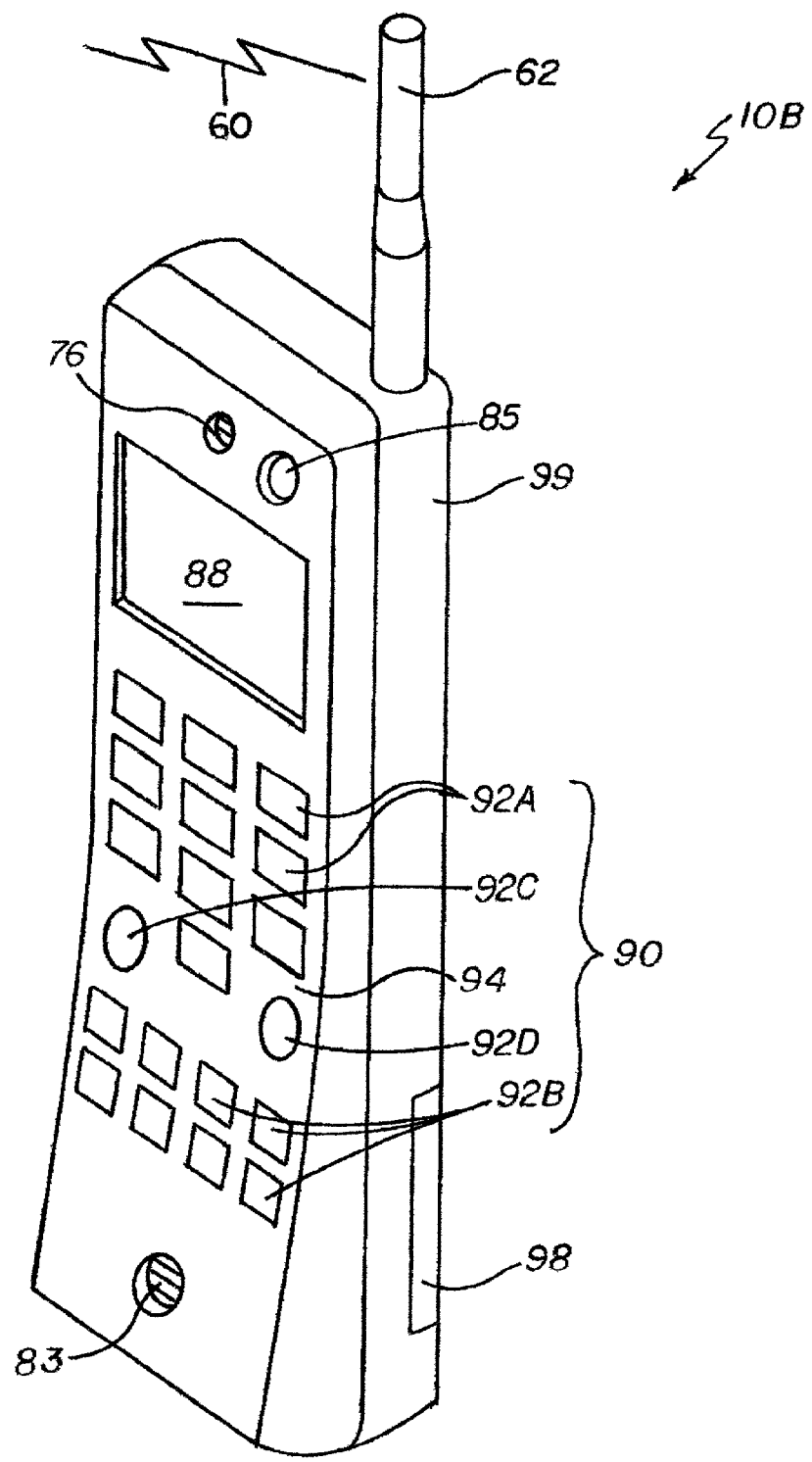
FIG. 3 is an elevational view of a mobile telephone unit operable in accordance with the present invention.
Figure 8:
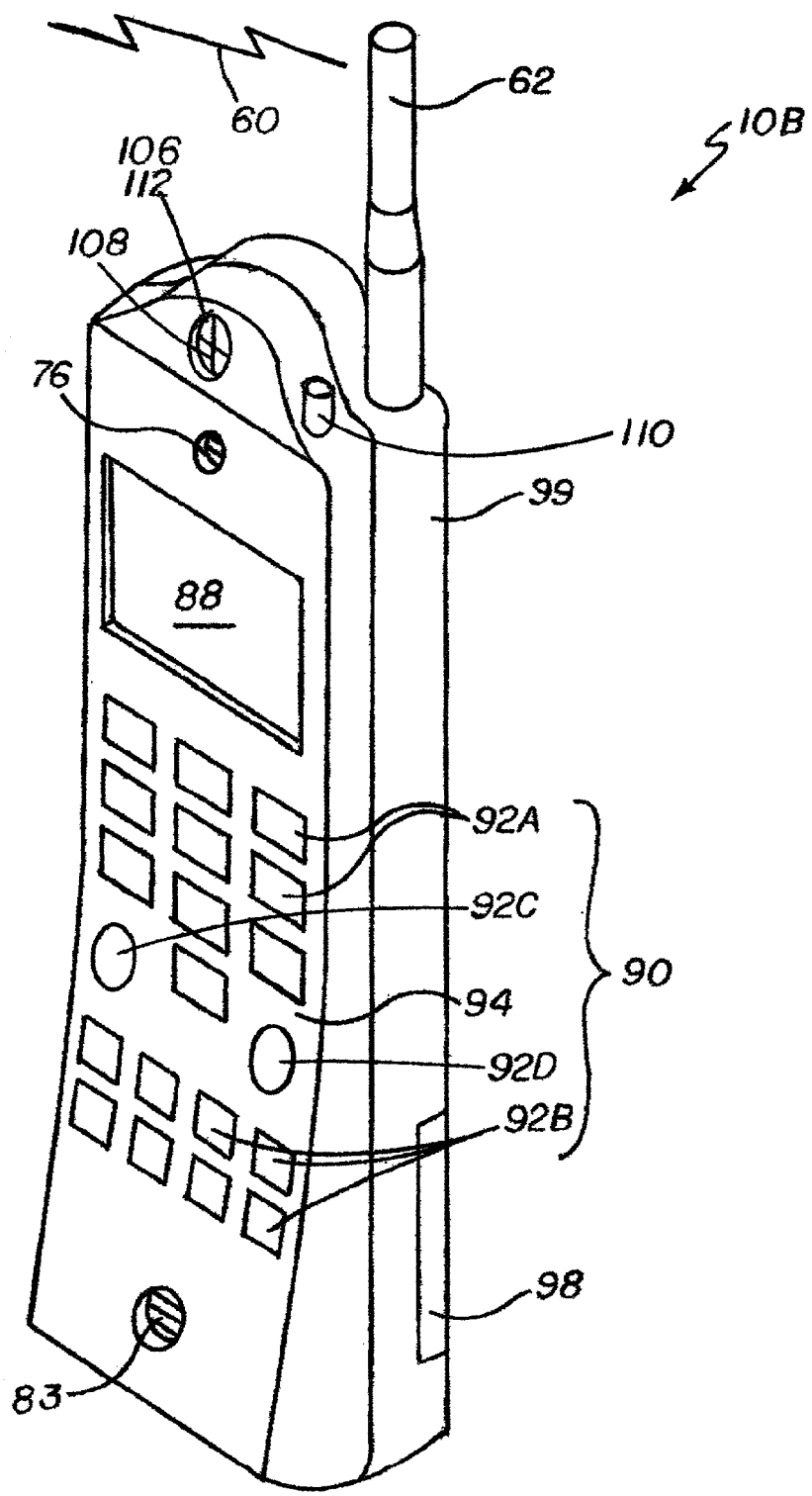
FIG. 8 is an elevational view of a mobile telephone unit operable in accordance with another embodiment of the invention.

In a communications system 50 of the invention, a single satellite system may provide both the PLS 9A and communications functions of satellites 7, 7A, whereby only a single antenna 62 is required on each telephone unit 10 (see FIGS. 2, 3 and 8).

The term "communications unit" or "telephone unit" is used to describe a terminal apparatus by which a user may access a communications system, and may transmit and receive voice, electronic data, e-mail, facsimile information and the like. As known in the art, the messages may be encoded and transmitted at various wavelengths appropriate to the particular system and to deter interception by other than the intended party. Prior art telephone units will be identified herein by the numeral 11 for stationary phones and 13 for mobile wireless cellular phones. A communications unit or telephone unit of this invention is generally identified herein by the numeral 10 with suffixes thereto representing specific units. Thus, the numeral 10 with alphabetic suffixes such as 10A, 10B, 10C, etc. will denote different telephone units or units being operated in a particular way. A telephone unit 10 may be configured as a desk or wall-mounted "hand-set" 10A, a mobile unit 10B, vehicle mounted telephone unit (not shown), a computer terminal or other apparatus.

The term "gateway station" identified by the numeral 12 refers to a communications station which handles the transfer of communications between a communications satellite 7 and a telephone unit 10 on earth. Typically, a large number of earthbound telephone units 10A may be linked, typically hard-wired, within a telephone system having a gateway station 12 for accessing a satellite communications system 7.

The invention may be broadly summarized as comprising methods and apparatus for connecting telephone units (communications units) 10 for unidirectional or bidirectional communication e.g. calls 23 on the basis of the particular location G# 30 of the calling telephone unit 10C and/or of called telephone units 10D, rather than on the basis of a conventional assigned telephone numbers. Apparatus for communicatively connecting the telephone units 10 comprises an intermediary system 15 which includes apparatus for receiving a call initiation signal 40 from a calling unit 10C, determining locations of calling and called units (10C AND 10D), prompting a call to a specified three-dimensional space or cell 56 of a defined callable universe, and initiating, maintaining, and terminating communications between the units. The intermediary system 15 includes gateway stations 12 where appropriate.

An exemplary system of one embodiment of the present invention is depicted generally in FIG. 1, and relates to a wireless communications system 50 using communications satellites 7, 7A and PLS satellites 9 or their equivalents. A portion of the earth's surface 25 is depicted and shows land area 27 separated from water area 29 by coastline 26. In this example, each location on or above the earth's surface 25 is specified as part of a matrix 31 of locations G. Each telephone unit, generically denoted as 10, will have at any time a specific earth location G identified by a geographic location number or G# 30. The telephone units 10 initiate and receive wireless calls 23 through communications satellites 7. In addition, mobile telephone units 10 receive PLS signals 32, typically from a plurality of PLS satellites 9. Signals 32 enable each unit 10 to determine its own earth location i.e. G# 30 to less than several meters, and preferably less than several feet using current GPS technology. PLS systems under development promise to provide even greater precision in identifying G# 30. The G# 30 may be used in any format which defines a position of a communications unit (phone unit 10) within a location-identifying matrix 31. A format of latitude 34 and longitude 36 may be used, and preferably includes a third dimension, e.g. altitude 38, either above mean sea level or above the earth's surface, or above the center of the earth, or even underwater. In some cases the third dimension 38 may be defaulted to a single value, as already indicated. For the sake of clarity, differing locations G# of telephone units 10 will be denoted by the numeral 30 followed by a suffix.

For example, a particular location in the Pecos River drainage area of New Mexico, U.S.A. is approximately 90 miles East of Albuquerque, and may be defined as N35°30'30.71"-W105°30'30.27"-A1905. In this example, latitude 34 is represented by a N or S coordinate, and longitude 36 is represented by an E or W coordinate. The altitude 38 is shown as 1905 meters above mean sea level. For ease of computation and radio transmission, the location G (in either 2 or 3 dimensions) may be collated, stored and transmitted in alpha-numeric or numeric decimal form such as, for example N35.50853056-W105.50840833-A1905 which represents the above location. In this example, the latitude 34 and longitude 36 are presented in degrees and fractions of degrees only, rather than in degrees, minutes and seconds. As noted, the two dimensions of latitude 34 and longitude 36 may be used with a third dimension elevation 38 defaulted for example to ground level.

More preferably, the latitude 34 and longitude 36 may be entirely decimal in form, e.g. wherein 360° is equivalent to a singular number 1.0. Thus, all locations G in latitude 34 or longitude 36 will fall between zero and 1.0. The location G# 30 will have the desired number of decimal places to obtain the desired precision.

In FIG. 1, the telephone units 10 may include stationary units which are typically installed in buildings, telephone booths, etc., as well as mobile units which may be personally hand carried or mounted in vehicles such as an automobile 16, boat 18 or airplane 22, for example. Where the text specifically refers to one of a stationary or mobile unit, stationary telephone units will be identified by the numeral 10A, and mobile units by 10B.

As is well known, each satellite 7, 7A, etc. of a communications satellite fleet has a service area 24 on the earth's surface 25. In actuality, the service area 24 may be three dimensional, including a vertical component extending above the earth's surface 25 and downwardly to below water level. When a telephone call 23 is made from a telephone unit 10 in one service area 24 to a telephone unit in another service area, the call 60 is "handed off" in call handoff 28 between the appropriate associated satellites 7 and 7A. The wireless communication system 50 of this invention is not dependent upon other hard-wired, cellular or satellite systems, but access between the systems may be provided.

The location based communications system 50 of the invention may be very large in scope in which e.g. all telephone units 10 are equipped for communication to other units by specifying the unit's location G on the earth's surface. Alternatively, it may be integrated with other systems currently used or proposed for use. For example, conventional (e.g. hard- or optical-wired as at 52) telephone units 11 may be accessed from the satellite communications system 9A through gateway radio communication 58 with gateway stations 12, as known in the art. Likewise, a cell gateway tower 54 may be accessed from a communications satellite 7 to provide cellular/satellite service to conventional mobile phone units 13 within the cell 56. A location based communications system 50 for underwater or underground "sonic" transmission may be interfaced with a surface transmission system using a conventional system or location based system.

Turning now to FIGS. 2 and 3, an example of a wireless telephone unit 10 of the invention is illustrated. FIG. 3 depicts a mobile version 10B of telephone unit, such as a personal or vehicle-installed radiotelephone or Onstar™ or equivalent onboard navigational communication and tracking apparatus, and is used herein to illustrate one embodiment of the unit. The unit 10 is illustrated as using radio frequency RF signals 60 to/from communications satellites 7. As shown, the telephone unit 10 includes an antenna 62 for transmitting radio frequency (RF) signals 60 to and receiving radio frequency (RF) signals 60 (or other type of transmission) from a transceiver of a communications satellite (CS) 7. Alternatively, the antenna 62 may send/receive signals 60 to/from a cellular tower or other system.

In the particular example shown in FIG. 2, the telephone unit 10B includes a modulator 64, a RF transmitter 66, a RF receiver 68, a demodulator 72, and a controller 70 that processes signals 60 from the receiver 68 and signals to the transmitter 66.

The telephone unit 10B also includes a location determination device 80 which may comprise a computer which determines the specific location i.e. G# 30 of the telephone unit 10B based on wireless signals 32 from a physical location system satellite (PLS) or satellites 9 received by PLS signal antenna 84. The location data may be stored in memory 82 as a latitude number 34 and a longitude number 36, and preferably with an altitude number 38 (or an equivalent third dimension), the combination together indicating the location or G# 30 of the telephone unit 10 on the earth's surface 25 or in three dimensions including altitude 38 e.g. above sea level, or alternatively above ground level. As already indicated, the location G# 30 may be configured and stored in memory 82 as a numeric or alpha-numeric string indicative of the 2-dimensional or 3-dimensional position G. Note that in the embodiment of telephone unit 10B in FIG. 3, the PLS signal antenna 84 is combined with the communications satellite signal antenna 62.

The telephone unit 10B includes a power supply 74, which typically includes a rechargeable battery (e.g. for a hand-held mobile unit 10B, and accessible through door 98 in the case 99) or conventional AC or DC power (e.g. for a stationary unit 10A or vehicle-mounted mobile unit 10B)

Also included in telephone unit 10B are a speaker 76 for audio e.g. voice output 78 and a microphone 83 for audio input 86. A display screen 88 provides visual indications of control messages, the unit's own G# 30A, the G# 30B and/or geographic zone GZ# 20 (see FIG. 4) of a currently called telephone unit 10D, transmitted data messages, etc. A user input device 90 with computer interface connections, typically a keypad with multiple keys 92, enables a user to operate the telephone unit 10B. As shown in FIG. 3, a user input device 90 may include not only a conventional telephone alphanumeric keyboard 94 with keys 92A, but additional command keys 92B for operation of the various devices and functions of the telephone unit 10, and an ON-OFF switch 92C. As shown, each of the devices associated with the telephone unit 10 is connected to the controller 70 for coordination and control thereof. As shown in FIG. 2, the telephone unit 10 will provide for at least one method to signal a user of a received call. The call indicator 85 may be one or more of audio from an electronic ringer, a visual signal from a flashing light, vibrator-induced motion, or other signal which may be sensed. In FIG. 3, the call indicator 85 is illustrated as a light.

In general, a stationary version 10A of the telephone unit 10 may have the same components as a mobile version 10B, i.e. CS antenna 62, transmitter 66, modulator 64, receiver 68, demodulator 72, controller 70, power supply 74, speaker 76, microphone 84, call indicator 85, location determination device 80, display 88, user input device 90 and memory 82 as well as memory in the controller 70 and other devices of the unit.

In one embodiment of the telephone unit 10, the unit also includes apparatus for determining the compass direction from the telephone unit 10B to another telephone unit. Several types of direction-finding devices 100 with direction memory 102 (see FIG. 2) are described, infra, together with the purpose and use thereof.

As already indicated, an exact location G # 30 on the earth's surface 25 or in the space about the earth's surface 25 or even below sea level may be defined in three "dimensions" or two "dimensions" plus a default third dimension, respectively. If the exact location G# 30 of a to-be-called telephone unit 10C is known, a telephone call 23 to that G# 30 from another telephone unit 10D will result in a communication connection. However, there are obvious sources of error which make use of an "exact" G# 30 difficult to use in practice. For example, under certain conditions, some current PLS systems are incapable of defining a location on the earth's surface 25 closer than to within about one meter. Furthermore, if a G# 30 is defined as a 6 inch by 6 inch square, moving a telephone unit 10 a few inches will remove it from the exact G#. In addition, if one or both of the calling telephone unit 10C and called telephone units 10D is moving, there will be a slight delay in transmitting/receiving PLS signals 32 and calculating G#'s 30 therefrom. Even current PLS receiving units at stationary locations experience a slight delay in determination of location. Newer GPS units are expected to greatly reduce the delays in location determination. However, to obviate these difficulties as well as errors in a person's estimate of distance 42 and direction 44, a useful Geographical Zone number i.e. GZ# 20 is created which defines an area or space surrounding and quickly "capturing" the G# 30D of the called telephone unit 10D in spite of PLS time delays and known sources of error including simultaneous movement of both telephone units 10C, 10D. A two-dimensional GZ# 20 with boundaries 21 is shown in FIG. 4, enabling telephone unit 10C at G# location 30C to complete a call to telephone unit 10D at G# location 30D by specifying the GZ# 20 rather than the G# 30D. It is noted that the direction 44 and distance 42 of G# 30D from G# 30C are defined along line 96 on the earths surface 25. An example of a two dimensional GZ# 20 denoting an area on the earth's surface is N-0.7784221-0.7784226*W-0.2232880-0.2232885, where N refers to boundaries along two spaced-apart latitudes 34A, 34B, and W refers to boundaries along two spaced-apart longitudes 36A, 36B. The geographic area bounded by these latitudes 34A, 34B and longitudes 36A, 36B comprises the GZ# 20. A three dimensional GZ# 20 includes altitude boundaries; an example is S-0.1444372-0.1444380*E-0.6667529-0.6667537*A-500-3000, in which the specified altitude 38 is between 500 meters and 3000 meters. When a three dimensional GZ# 20 is used, the controller 70 within each telephone unit 10B may be set at a default elevation 39 which considers extant ground elevation 38 as 0.000, regardless of its elevation above sea level. Current PLS satellite systems 9A use such a program factor, and the telephone unit 10B of this invention may utilize the current PLS system to define a default elevation value. Sub-terrainian elevation values such as of underground railways, mines, etc. and even underwater elevation values, may be determined and used in this location-based communications system 50. Actual elevations above mean sea level 29A may optionally be used in the GZ# 20, especially for calls 23 to/from an airborne telephone unit(s) 10B. In a further embodiment, a data base comprising actual land surface elevations 38 i.e. a terrestial map may be incorporated into the telephone unit's memory 82, as well as in the memory of the PLS satellite system 9 or into the data base of a communication administrative body (not shown), e.g. AT&T. The data-base elevations 38 may comprise default elevations 39.

A geographic zone (GZ# 20) may be generated by a telephone unit's user, or as described herein, automatically by the unit 10 based on settings in the unit's memory 82. The size of a GZ# 20 which will consistently capture a telephone unit 10D is dictated by the expected errors, known time delays in the PLS system 9A, and the desired degree of confidence in the G# 30 being enclosed within the GZ#. As the specified size of the GZ# 20 is increased, the degree of statistical confidence in connectivity will increase. In practice, it is desired to provide 100 percent (or nearly 100 percent) confidence in connectivity. However, use of an overly large GZ# 20 may result in the area encompassing more telephone units 10 than the single unit 10D to which communication is directed Discrimination procedures are then required for a caller at telephone unit 10C to reach the desired telephone unit 10D.

In the communications system 50 of this invention, one method by which telephone unit 10C may call telephone unit 10D is by specifying the G# 30D of unit 10D. As already discussed, this method is currently limited by lack of dimensional discrimination and time delays in PLS systems 9A.

In another method, a minimal GZ# 20 is defined whose boundaries surround and include the desired G# 30D. This is useful where the called telephone unit 10D is a stationary phone with an unchanging i.e. permanent G# 30D. A minimal GZ# 20 may have dimensions of only 5 meters by 5 meters, or 2 meters by 2 meters for example, depending upon the dimensional discrimination of the PLS system 9A. In a communications system 50, all telephone units 10 called by specifying the exact location G# 30 are automatically assigned a minimal GZ# 20 about the G#. A GZ# may have any regular or non-regular shape 48, including two-dimensional shapes such as a circle, oval, square, rectangle or other polygon, and any three-dimensional shape including spherical, cylindrical, conical and polygonal for example. FIG. 5 depicts an oval GZ# 20 surrounding a called telephone unit 10D. Likewise, FIG. 6 depicts a rectangular GZ# in which a called telephone unit 10D is captured. The use of a GZ# 20 has many other advantages which will be described, infra.

A telephone call 23 may be made from telephone unit 10C at G# 30C to telephone unit 10D at G# 30D in several ways.

Figure 10:
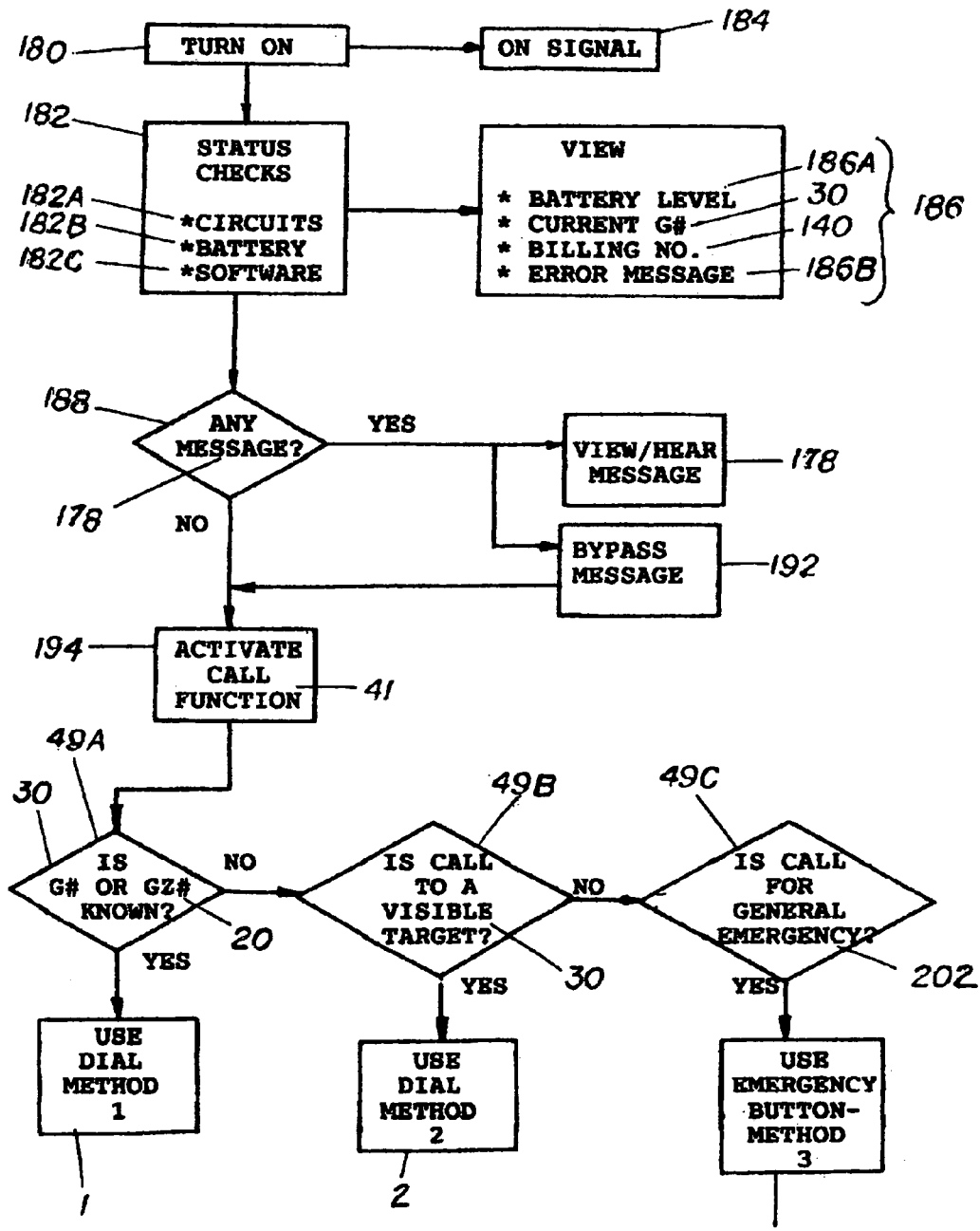
FIG. 10 is a flowchart of exemplary preliminary steps for initiating a telephone call in accordance with the methods and apparatus of the invention.

The initial steps in placing a telephone call 23 from a telephone unit 10B are shown in FIG. 10, and include activating the ON-OFF switch 92C to an ON position. The unit 10B may then make status checks 182 including circuitry 182A, battery 182B and software integrity 182C. Various data may be displayed on the display screen 88, including for example battery charge level 186A, current G# 30 of the calling unit 10B, billing number 140 of the unit (which may be optionally configured as currently used telephone numbers), and any error messages 186B.

The telephone unit 10B may provide for recall 188 of messages 178 received while the unit was turned off or the user absent. The messages 178 may be viewed on the display screen 88 or heard, depending upon the type of message and the message retaining device, e.g. memory 176. The messages 178 are erasable.

Upon activation 194 of the call function 41, a G# 30 or GZ# 20 must be entered defining the location of the telephone unit 10B which is to be called. The particular method used depends upon several factors.

Figure 11:
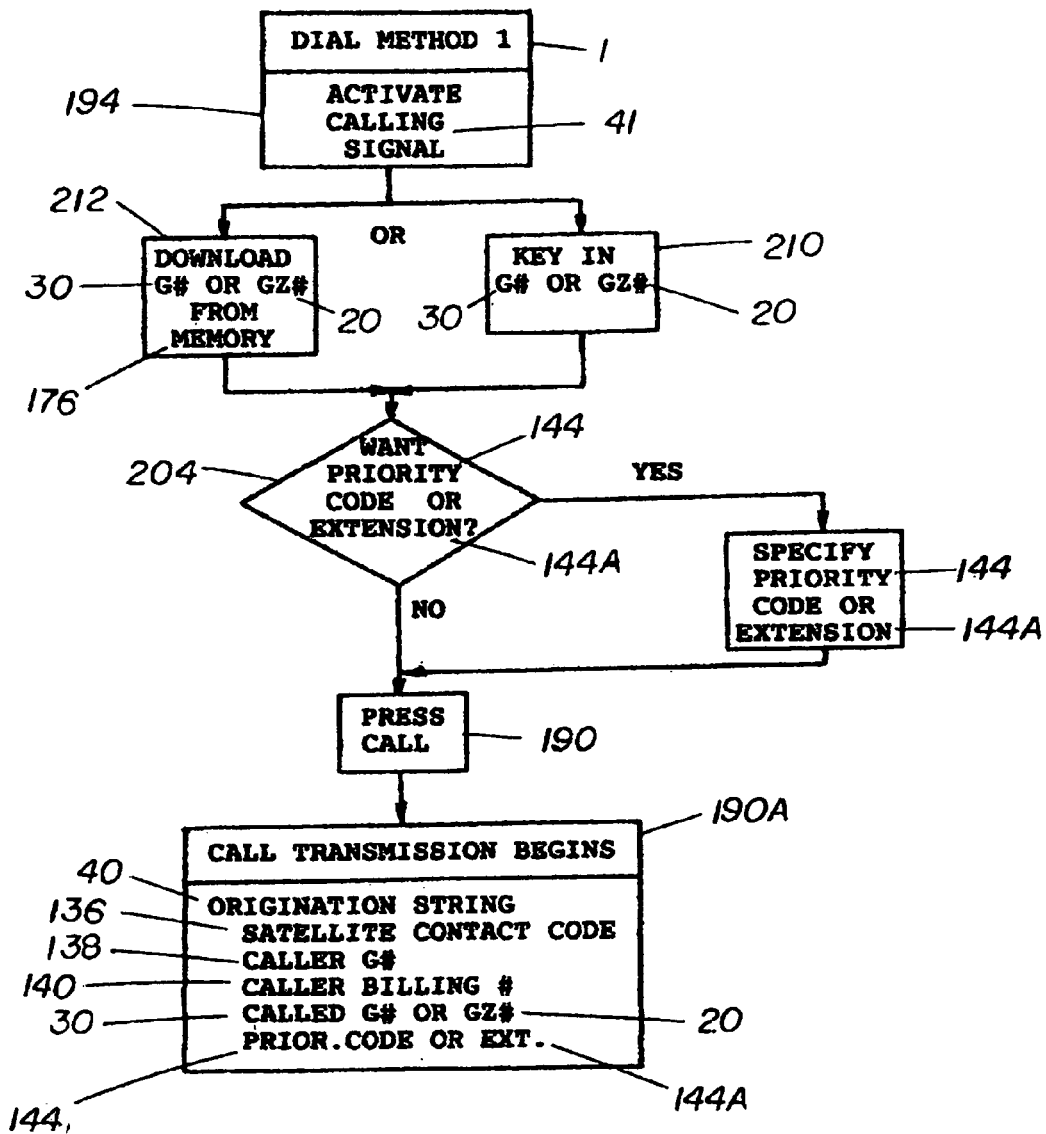
FIG. 11 is a flowchart of exemplary secondary steps for completing a telephone call in accordance with one embodiment of the invention.

Dial Method 1: If the G# 30 or GZ# 20 of the called telephone unit 10D is known to the caller 33, a first condition 49A, it may be keyed in, i.e entered by hand 210 or from the unit's memory 176. The method is illustrated in FIG. 11. A priority code 144 or extension number 144A may be added to the origination string 198 to limit the call 23 to a phone unit 10D having a priority clearance, or one having an extension where more than one phone unit 10D is connected to a single receiver 68. Call transmission 194 is then initiated 190 to a communications satellite 7, cell gateway station 54, or telephone wire grid 52 to locate the called telephone unit 10D and complete the call 23.

As depicted in FIG. 11, if the location G# 30D of the to-be-called telephone unit 10D is known, the call 23 may be made using the known G# 30D. The system 50 may be set up to apply a small but inclusive default GZ# 20 about any specified G# 30 which is called. Thus, a minimally sized G Zone GZ# 20 may be applied by telephone unit 10C or by the transceiver controller 120 of a communications satellite 7, or by other communication hardware, not shown, to enable a very high probability of reaching the called telephone unit 10D. The caller 33 may wish to apply a priority code 144 to the G# 20 where there may be more than one telephone unit 10 within the called G# or GZ#. In a multi-phone system where only one phone unit 10 is to be used for some calls 23, a hierarchy of phone units 10 may be used. For example, the captain of a ship would normally be assigned a primary priority code 144A; other telephone units 10 on the ship may have assigned secondary 144B or tertiary priority codes 144C. A call 23 made to the ship will ring the telephone unit 10 having the highest priority code 144A, unless a particular non-primary code 144B. 144C is specified by the caller 33 in the alpha-numeric calling string 198 of the call origination message 198. Calls 23 placed without a priority code 144 would ring the highest priority unit 10 first. If the captain does not have a telephone unit 10, and there is no assigned high priority phone 10 on board, any call 23 encompassing the GZ# 20 of the ship will activate any phone 10 having a secondary priority, or all phone units 10 on the ship. A plurality of priority levels may be established. In addition, of course, each phone unit 10 will be assigned its own identification number 174 (comparable to present-day telephone numbers) which may be inserted in the calling string 198 to specify the particular telephone unit 10.

In other situations, such as an office with multiple telephone units 10, calls 23 to/from all units 10 may be funneled through a single radio antenna 62. For example, each individual telephone unit 10 may be assigned a priority code number 144 or an extension number 144A which may be specified in the call origination alpha-numeric or numeric string 198.

Figure 15:
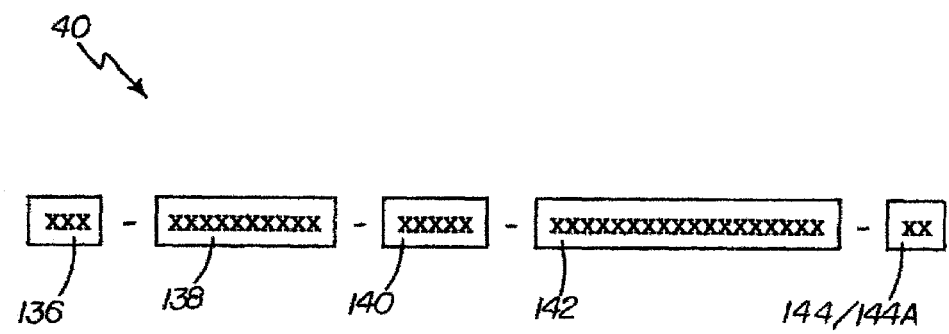
FIG. 15 is an illustration of typical parts of a call origination message of the invention.

As shown in FIG. 15, the alpha-numeric or numeric call origination string 198 which denotes the routing may include for example, (a) satellite contact code 136 which includes a normal string to achieve contact and instructions for the communications satellite 7; (b) the current location G# 138 of the calling telephone unit 10; (c) a billing number 140 or unit identification code by which a periodic bill may be assembled for the user; and (d) the called G# or GZ# 142 together with priority code number 144 or extension number 144A if desired. The call origination string 198 may include codes for other factors as well, including user-specified factors.

Figure 12:
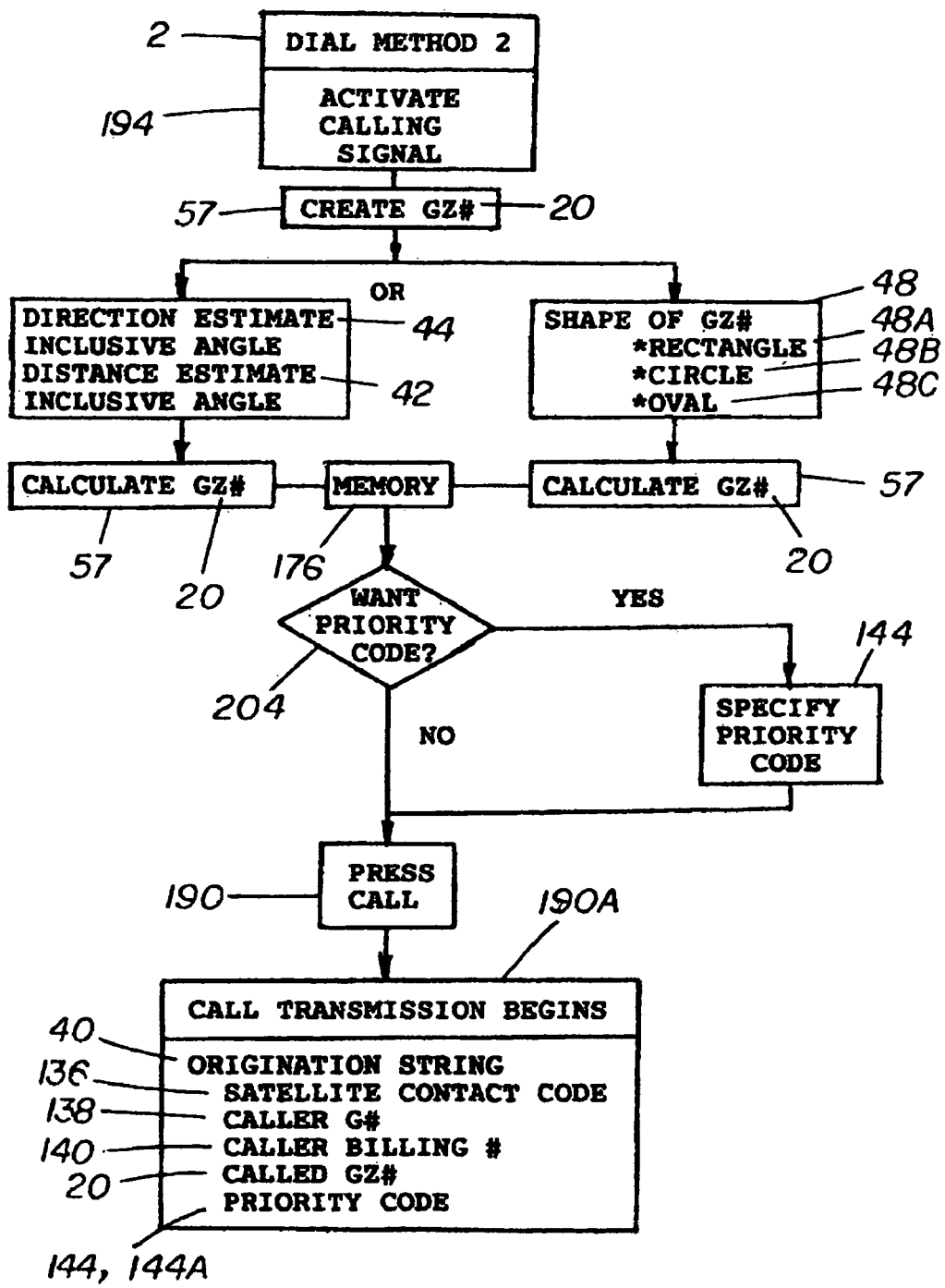
FIG. 12 is a flowchart of exemplary secondary steps for completing a telephone call in accordance with another embodiment of the invention.

Dial Method 2:

A unique feature of the location based communications system 50 may be used to provide communication with an unknown (or unidentified) party or telephone unit 10 at an unknown (but roughly estimatable by sight, sound, etc.) location G# 30. In this method, illustrated in FIG. 12 and using the system shown in FIG. 7, a telephone call 23 is placed to a user-defined GZ# 20. As depicted in FIG. 7, for example, a distant ship 19 carrying a telephone unit 10D at location G# 30D is sighted by an operator 33 of telephone unit 10C at location G# 30C. The call initiation message string 198 will include numeric or alphanumeric coded (a) location G# 30C of the calling unit 10C as well as codes indicating (b) estimated direction 44 of the telephone unit 10D from telephone unit 10C, (c) estimated distance 42 to unit 10D, and (d) the size 46 and shape 48 of a GZ# 20 which will include the G# 30D. The direction 44 may be determined using a compass 100 calculation from PLS transmission data, or by other methods. One or more standard size/shape configurations 48A, 48B, 48C may be stored in memory 176 for instant recall and use. As in Dial Method 1, a priority code 144 may be entered into the GZ# 20.

In one embodiment of the location-based communications system 50, a telephone unit 10 (hard-wired, cellular or satellite based) with a conventional telephone number, may be called from telephone unit 10C by simple use of the phone's conventional phone number. The message will be transferred, for example, from a communications satellite 7 through a satellite gateway station 12 or cellular gateway station 54 to the hard-wired, cellular or satellite system, respectively.

An exemplary application of a user-defined GZ# may be illustrated by reference to FIG. 7. Assume that a sailor on a boat on an ocean has a mobile telephone unit 10C having an earth location G# 30C. Because of an emergency, the sailor wishes to contact the nearest other watercraft; a ship 19 which appears to be a cruise liner is visible at an estimated distance 42 of 3.5–4 miles. The sailor may place a telephone call to the sighted ship 19 which has a telephone unit 10D.

Using features of a telephone unit 10C of the invention, the compass direction 44 of the cruise liner 19 (with telephone unit 10D) from the sailor is estimated and stored in memory. The sailor may place a telephone call 23 to a telephone unit 10D on the cruise liner 19 by creating the location and boundary limitations of a GZ# 20 enclosing the telephone unit 10D, i.e. enclosing the cruise liner 19. The GZ# 20 is based on (a) the known G# 30C of the sailor's telephone unit 10C, (b) the estimated direction 44 to ship 19, (c) the estimated distance 42 to ship 19, and (d) the size 46 and shape 48 of the GZ# 20. In this example, the GZ# 20 is shown as an arcuately truncated angular (conic section) projection with an axial central point 104 at the selected estimated distance 42 of 4 miles. In the calculation 57 of GZ# 20, the sailor has selected the near and far end boundaries 21A and 21B, respectively of GZ# 20 to be ±25% of the selected distance 42, whereby the GZ# 20 extends from 3 to 5 miles from the calling unit 10C. The end boundaries 21J, 21K may be preprogrammed based on the selected estimated distance 42.

The size factor 46 which in this case is the angular width 157 of the GZ# 20 is selected by the sailor to be that between lines 21D 5° relative to a line 96 between the two telephone units 10C and 10D. This creates a relatively small GZ# 20D with a total 10° spread between side boundaries 21D. Optionally, other widths or "spreads" 157 may be selected, depending upon the sailors inherent confidence of accuracy in determining the direction 44. For example, spreads of ±10° and ±15° are shown by boundary lines 21E and 21F, respectively. The selected spread 157 is preferably variable to allow for a user's accuracy in estimating direction 44 and/or distance 42 by sight or sound under the particular weather conditions.

For the sake of simplicity, a telephone unit 10 of the invention may be configured with predetermined values of distance 42 and GZ# size 46, enabling one-button entry. In more sophisticated embodiments, various GZ# shapes 48 and sizes 46 may be selectable when making a call 23. Such selection may be useful to maximize the chances of "capturing" the G# 30 of the desired party while eliminating or minimizing the chances of having other telephone units 10 within the GZ# 20.

In another embodiment, a conical or other shape GZ# 20 may be defined, either distantly truncated or non-truncated, and the telephone unit 10C set to detect and call the telephone unit 10D within the GZ# which is nearest the calling telephone unit 10C. In this embodiment, each telephone unit 10 within the GZ# indicates its location G#30 to a computer (not show which automatically selects and calls the telephone unit 10D nearest the calling telephone unit 10C. Optionally, emergency calls may automatically be assigned a priority code 144 to eliminate calls to persons incapable or non-authorized to assist. The priority code criteria may be sequentially "down-graded" from a top priority 144A to a lowest priority. If there is no response from a telephone unit 10 in the GZ# 20, the search is widened, using a larger GZ# 20. This "selective reception" method enables caller-controlled discrimination to ensure contact with a desired party 10D.

Figure 16:
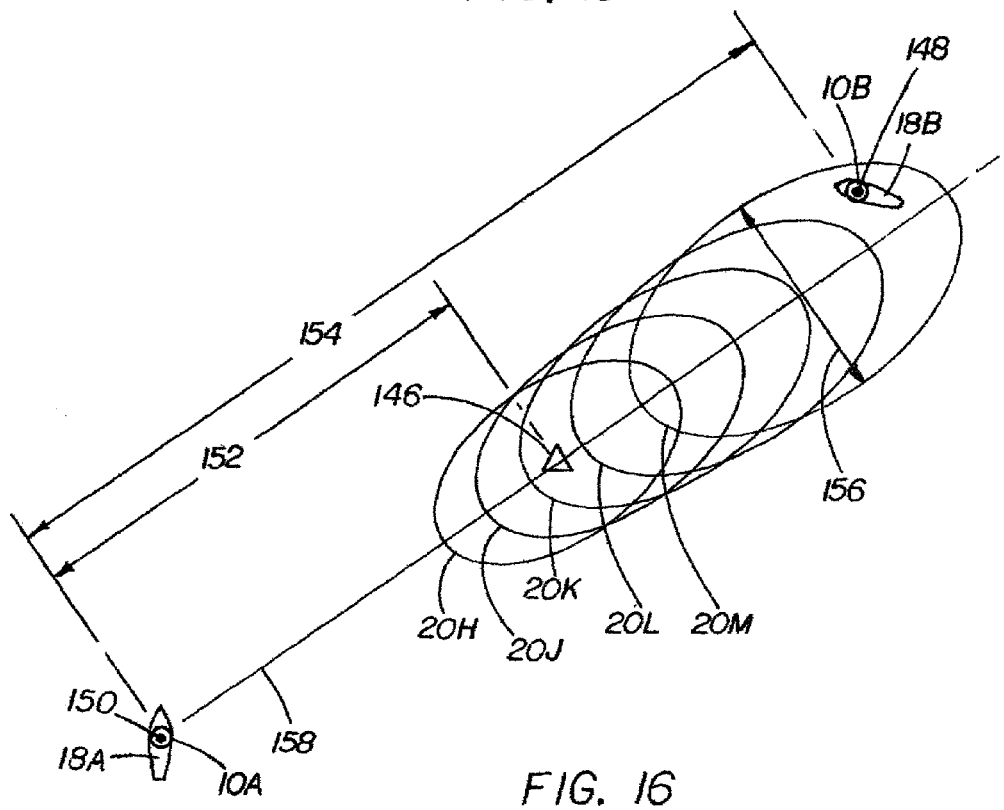
FIG. 16 is a top view of a user-defined expandable geographical zone for calling a distant telephone unit without knowing its position, in accordance with the invention.

In a further embodiment, illustrated in FIG. 16, a time-expanding GZ# 20 may be initiated, in which an initial small GZ# is continuously or sequentially expanded to a larger GZ# until a responsive telephone unit 10D is located and identified. The GZ# 20 may also be moved as well as increased in size 46. This method acts to discriminate between plural telephone units 10 within a given area, and is also useful in expediting an emergency call 23 to the nearest phone unit 10D. The expanding GZ# 20 may be centered about the calling telephone unit 10C or about a distant point 104. The expansion may of course be in any direction in three dimensions. For certain uses, a time-reducing GZ# 230 function may be used, wherein the size of the called GZ# 20 changes from larger to smaller. In an area crowded with telephone units 10, improved discrimination is possible by reducing the size of GZ# 20.

FIG. 2 indicates a telephone unit 10 with a direction finder device 100 such as for example, a computer accepting signals from a PLS satellite 9. The 2-dimensional or 3-dimensional direction 44 from a caller telephone unit 10C to a desired callee telephone unit 10D may be determined by a direction finder device 100 in several ways. As shown in the embodiment of FIG. 8, a user sights through a viewfinder 106 and aligns a reticle or reticles 108 with the person or item associated with the telephone unit 10D. The user may press a button or key 10 to compare the direction with a magnetic compass 59, for example, and store the result in memory. A computer program may be stored in controller memory or memory 102 to correct the magnetic compass 59 direction value for natural variations over the surface of the earth. The telephone unit 10C is constructed to minimize stray current leakage, both ambient and inherent, which will affect the magnetic compass 59. In another embodiment, a close approximated value for direction 44 may be obtained by aligning the telephone unit 10C with the to-be-called telephone unit 10D and determining the compass alignment of the unit from PLS signals 32 transmitted by the PLS satellites 9. Data required to calculate compass alignment is the same data which is transmitted in the PLS signals 32 for location determination, as long as it provides the positions of the PLS satellites 9 or directions thereto relative to a grid of earth coordinates 34, 36, and 38. For example, movement between two PLS positions G# 20X and 20Y could be used to calculate compass alignment.

It will be recognized that the viewfinder 106 may be modified to also include a rangefinder device 112 therewith, whereby an estimated direction value 44 and an estimated distance value 42 may be obtained at the same time. Such an apparatus will reduce the errors in those estimations, and permit the use of a GZ# 20 of smaller size.

In another embodiment, the direction finding device 100 may comprise a computer program in memory 102 which is activated through use of a key 92B. A user then moves the telephone unit 10C in the direction of telephone unit 10D. As the unit 10C traverses through a number of G#s 30, the direction 44 is calculated from the change in G#. The distance 42 which must be traversed to obtain a proper estimate of direction 44 is a function of the discrimination of the PLS satellite system; PLS systems being developed will enable adequately precise direction determination by moving the telephone unit 10C less than a few feet, for example.

As shown in FIG. 16, a person on a first boat 18A having telephone unit 10A intends to call 23 a second boat 18B (presumably having a telephone unit 10B) which is on the distant horizon. Using a direction finder 100 on telephone unit 10A to denote a direction along the line-of-sight 158, an exemplary call is made through a communications satellite 7 specifying a GZ# 20H having an oval shape 48 of specific size 46 and centered at an estimated distance 152 from the calling boat position 150, toward the second boat 18B. There will be no response from telephone unit 10B on the second boat 18B because in this first calling attempt, boat 18B is outside of the GZ# 20H A feature of this particular unit 10A is a computer program which changes the GZ# after receiving no response within a set time period. The program varies the GZ# 20 by (a) expanding its size (particularly width 156) in a direction in two or three dimensions and (b) moving the GZ# in a specific direction. In the example of FIG. 16, a GZ# 20J is entered and called, without receiving a response in the preset time. Additional GZ# 20K and 20L are then called in turn, without response. A further GZ# 20M is called, which activated telephone unit 10B on boat 18B, located at position 148. The preset time for GZ# change is sufficient to permit telephone unit 10B to receive the call origination message 40, compare it with its own G# 30, and send a confirmation message to the communications satellite 7 which processes and relays the confirmation to phone unit 10A. Although this system may be configured in many different ways, it may be simplified to a single shape 48, a single direction of movement relative to the user, and a single change (optionally an increase or decrease) in the size 46 of the GZ#. The system may be preset to use this location method automatically.

The telephone unit 10 may be configured to provide for a diminishing size program, wherein the size 46 of a GZ# may be reduced. This would be used, for example, when the resulting numbers of phone units 10 which respond to the call is greater than can be readily handled.

In one embodiment of the invention, telephone units 10 are programmed so that, upon sensing a telephone call origination message from a communications satellite 7 (or other location based communications system) which agrees with its own G# 30, the unit's controller 70 turns on a ringer or other call indicator 85 to signal the user, and in addition, transmits a short return acknowledgement message 40A to the communications satellite 7 indicating the unit's G# 20 and identification or billing number 140. In this mode, a record of the unit's location G# 30 is maintained, even if the user does not immediately respond to the call 23. In a further embodiment, this feature is programmable to bypass the unit's ON-OFF switch 92C and respond with its G# 30 and identification number 140 to every call 23 it senses which is in agreement with its location, even when the unit 10 is turned OFF. Thus, the location G# 30 of a particular telephone unit 10 may be monitored without the knowledge of the user. This feature also allows a stolen telephone unit 10 or a vehicle containing the unit, to be continuously monitored.

Dial Method 3: The communication system 50 of the invention enhances quick responses to emergency situations 202.

Figure 9:
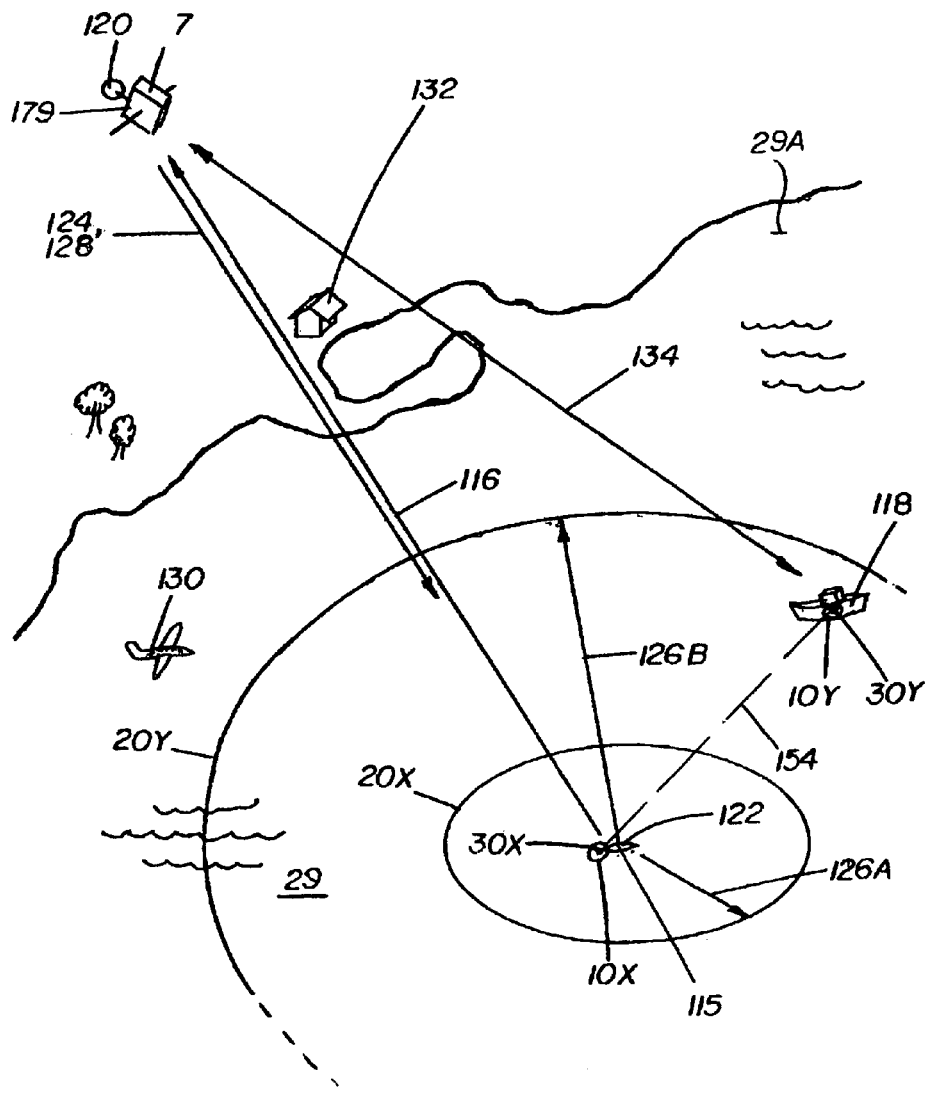
FIG. 9 is a figurative illustration of the earth's surface within the service area of a communications satellite, and depicting a method of calling for assistance in accordance with an embodiment of the invention.
Figure 13:
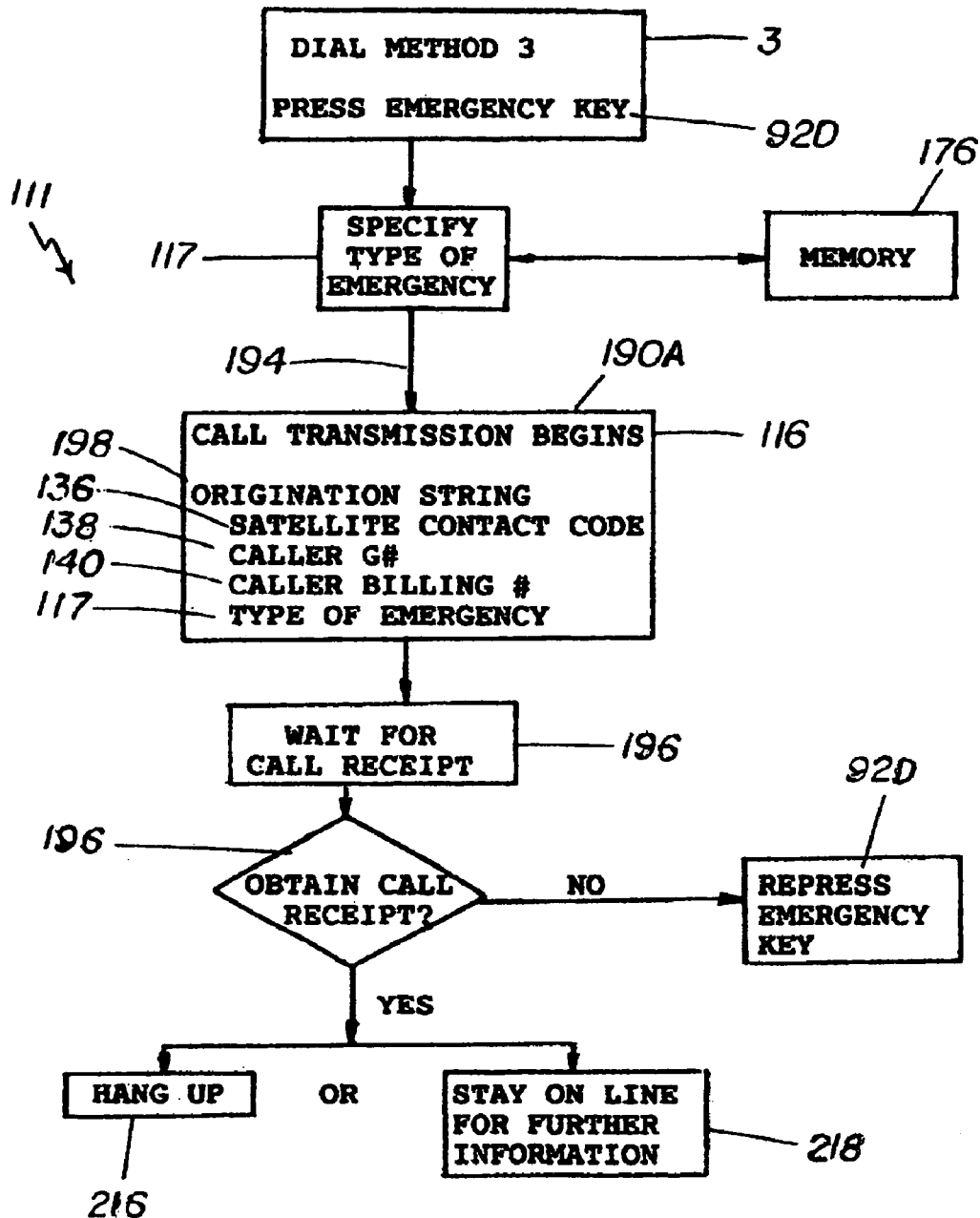
FIG. 13 is a flowchart of exemplary secondary steps for completing a telephone call in the event of an emergency, in accordance with a further embodiment of the invention.
Figure 14:
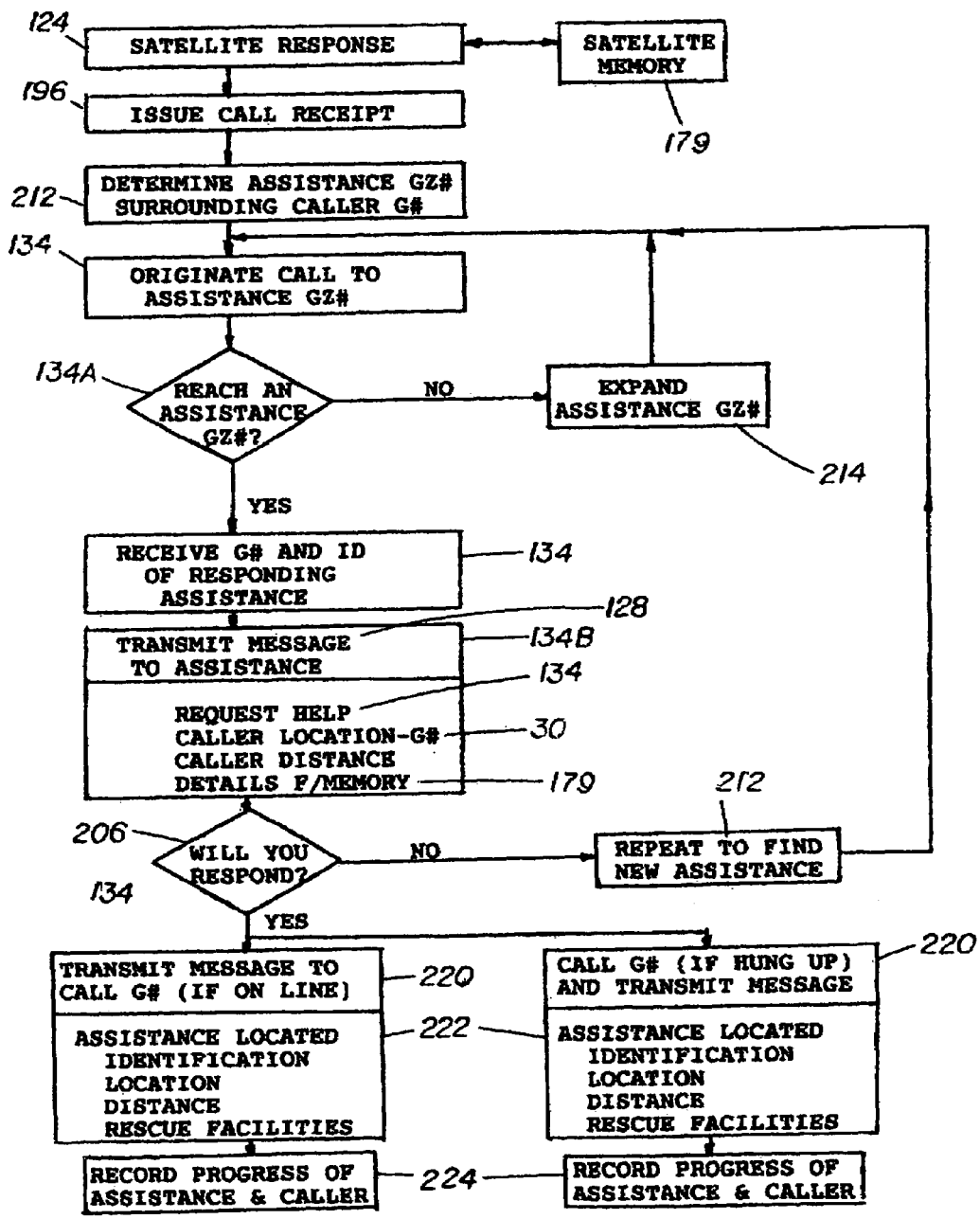
FIG. 14 is a flowchart of exemplary steps taken by a location based communications system in response to an emergency call in accordance with an embodiment of the invention.

In this method, illustrated in FIG. 9 as applied to a maritime emergency 202, an EMERGENCY system 111 may be incorporated in the controller 70 of a telephone unit 10 (FIG. 2). The method is also shown in FIGS. 13 and 14, and this discussion will make reference to all of these figures. Upon activation of a designated EMERGENCY key 92D (FIGS. 3 and 8) by the user 33 e.g. a sailor on a boat 122 at sea 29 or by a signal from an emergency sensor 115 on the boat, an emergency message 116 is transmitted by call 23 from the boat's telephone unit 10 to communications satellite 7. This message 116 may be monitored by the Coast Guard or other organization which will interact with rescue activities. The message 116 may simply indicate an emergency, or a preprogrammed detail 117 indicating the type of emergency 202 may also be included e.g. by using pre-installed messages in memory 176, or using keystrokes to write a message 116. The message 116 may be configured to automatically include vital information, e.g. the satellite contact code 136, the unit's location G# 30X and identification number (billing number) 140 a description of the vessel 122, number of crew, and safety equipment on board, as well as an indication of the type of emergency 202. Other information may be included as helpful in the situation. Upon receipt of the emergency message 116, communications satellite transceiver controller 120 initiates a program to find the nearest available source of assistance for the boat 122 having an emergency. In addition, a message 124 may be returned to the caller 33 at G# 30X indicating "call receipt", i.e. confirmation of receipt of the emergency call 23 by the communications satellite 7. Thus, the caller 33 knows whether to repeat the emergency call 23. Upon confirmation from the satellite 7, the caller may simply hang up and wait for rescue or calls 23 from an assisting party. At sea 29, the sources of assistance are primarily other boats or ships at sea, but may be aircraft 130 as well, or a land-based station 132.

The communications satellite 7 (or other location based communications system) then originates a telephone call 124 specifying a GZ# 20X which surrounds the boat 122 in trouble. The GZ# 20X may be circular about the boat 122, as shown, or may be of another shape. An example of a GZ# 20X may have a radius of 10 miles about the boat's location G# 30X. If there is no response to the call, i.e. no other telephone units 10 respond to the call specifying GZ# 20X with a 10 mile radius 126A, the radius of GZ# 20X may be expanded (to a radius 126B of 30 miles, for example) to form a larger GZ# 20Y, and a new call 128 originated.

When a source of assistance such as ship 118 at G# 30Y answers the call, for example, several alternative programs may be performed. The call 134 which reaches a responding ship 118 may contain the location 30 of the boat 122 in trouble, any other information 179 concerning the emergency 202 which was transmitted to the satellite 7, and a query 206 concerning possible assistance. The message 128 is preferably in digital form for viewing, but may also be in voice or other form. The vessel's captain, radio room, bridge or specified communications base may answer the call with a call 134 with an indication of whether the vessel 118 will assist boat 122 and information 222 about the vessel 118. If desired, voice or other communication between the boat 122 and the ship 118 may be maintained. All during the rescue period, a record 224 of the position G# 30X of the beleaguered boat 122 is maintained by the satellite 7. If desired, a continuous recording of all communications may be maintained for future review. In a preferred embodiment of the invention, all vessels would have a coded listing of factors which may effect their ability to respond to an emergency 202. Such listing may be transmitted automatically to the satellite 7 in responding to the query. Furthermore, the programmed controller 120 of the satellite 7 may be enabled to distinguish, in a file based on identification number, which source of assistance may respond to the emergency more quickly or be better equipped for the task. Safety organizations such as the Coast Guard may have their telephone units 10 set to intercept and record all calls denoted by the emergency activation of a telephone unit 10 such as from a boat at sea.

The location based communication system 50 of the invention may be used on a smaller scale. For example, a seagoing vessel 122 may have a miniature location matrix 31A which is specific to the ship. Each crewman may wear a portable telephone unit 10. The ship-specific matrix 31A may comprise a mini-cell system with its own priority listing, and interact with an earth-position matrix 31 of G# 30 locations to provide actual locations of each crewman on the ship. In addition, the matrix 31A may be provided with an outer safety perimeter beyond which an alarm will be activated. For example, the location of a man overboard will lie outside the safety perimeter. Thus, there will always be an immediate man overboard alarm, as long as the crewmen have an attached telephone unit 10. Of course, in a simplified method, the "telephone" unit 10 may simply comprise a small device wearable by a crewman, for repeatedly transmitting its location to a central telephone unit 10. An alarm may be automatically sounded if the transmitted location is outside of the ship's safety perimeter, or if the transmission ceases (unit broken or battery depleted). An advantage of this tape of alarm is that normally the telephone unit 10 of the man overboard will continue to transmit its location, alleviating current problems in locating the sailor.

Thus far, various embodiments of the location based communications system 50 have been illustrated in terms of marine or marine-to-shore use, using communications satellites and PLS satellites. However, use of the system 50 is also advantageous for use in land-to-land, land-to-air, and air-to-air communications, using satellites, cellular systems and/or wired/optical connections or any combinations thereof.

One feature of the invention comprises determination of both the absolute direction and velocity of a moving telephone unit 10M. Further, these factors may be determined relative to a second telephone unit 10N. By use of a mathematical vectoring program, the location based communications system 50 may be useful in various applications. The system permits extrapolations of existing travel directions and speeds. For example, a possible collision between two aircraft may be predicted and avoided by warning the pilots.

In another example, a trans-oceanic flight which becomes disabled and is forced to "ditch" will be provided with a series of sequential locations which are extended to a predicted ditching location. The location-based communications system may be used by the plane's crew, a ship in the area or an administrative body (Coast Guard, etc.) to determine the locations and rescue capabilities of ships in the area so that the plane's pilot may be directed to the most "optimal" ditching site for maximizing rescue opportunities. Simultaneously, the rescuing ship(s) will be redirected to the expected ditching site. This system is enhanced by requiring sea-going vessels to include in their computer memory a retrievable coded description or listing of rescue apparatus and capability. The communication system 50 may be entirely operated without human intervention, through the use of appropriate software and calling string prefixes and suffixes useful for obtaining particular information.

In another example, use of the invention in aircraft enables communication between airplanes or between an airplane and a control tower which automatically supplies all information about the airplane, including its present position, heading, speed, and elevation. Furthermore, this information may be automatically received for all planes and integrated into visual and electronic outputs which enable air traffic controllers to be aware of (and direct) all air traffic without the use of radar at all. Optionally, radar may be used as a backup system. Pilots will be made aware of all surrounding aircraft; pilots of small planes can identify other aircraft without visually seeing identification numbers thereon.

The location based communications system 50 has great potential for public safety issues. Medical personnel, police, firemen and hazardous team members may each have a specific prefix or suffix added to their G# 30, so that calls for help may be specifically directed to an appropriate party. In a useful form, illustrated in FIG. 17, an area map and navigation program are integrated with the communications system 50 by which any G# 30 may be identified. Other features may be useful for official use, and limited thereto.

Figure 17:
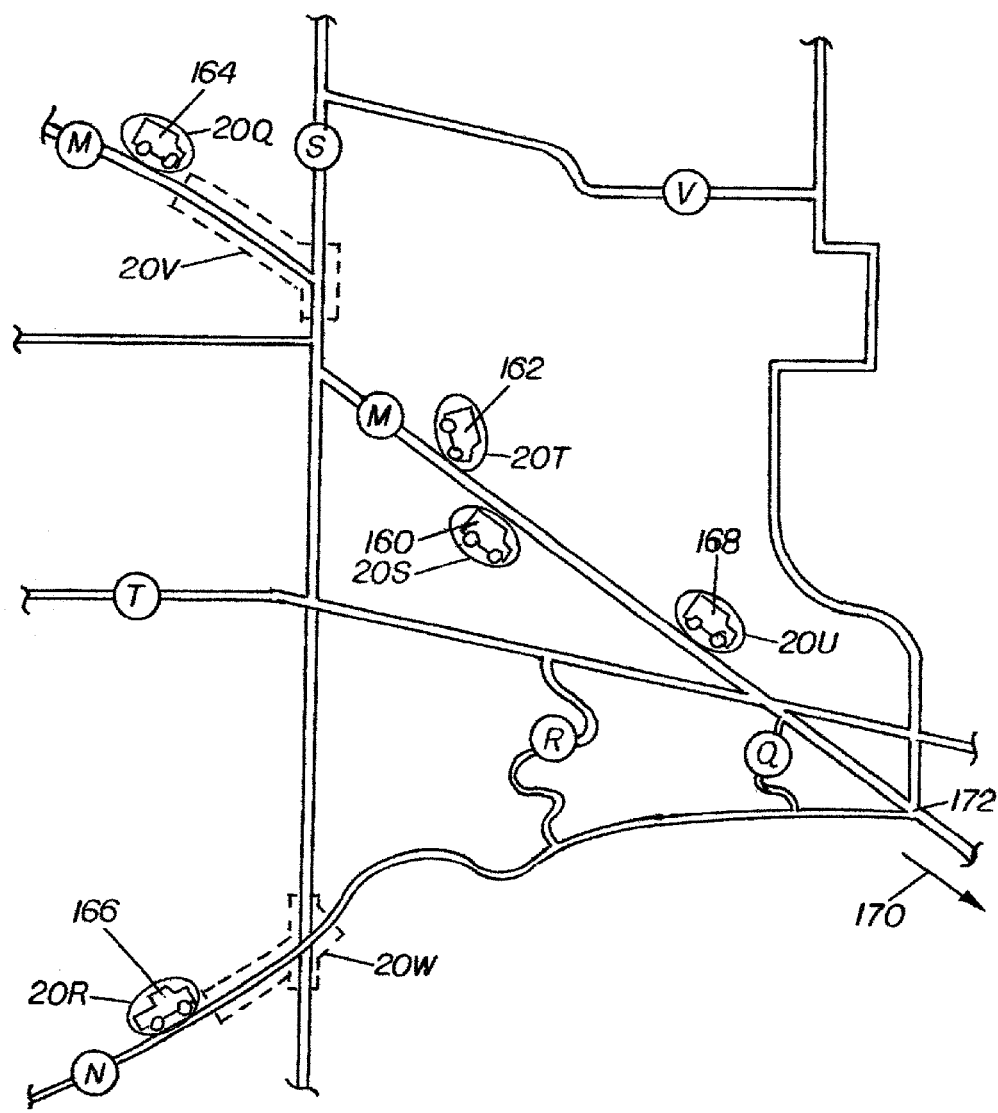
FIG. 17 is a plan view of a hypothetical matrix of locations superimposed on a road map to illustrate various applications of the present invention to safety, rescue, traffic control and law enforcement.

In an example illustrated in FIG. 17, the system 50 may be used by a law enforcement officer in an officer's vehicle 162 to determine the velocity of another speeding vehicle 160, immediately identify and call vehicle 160 if it has a phone unit 10. To make verbal contact with the diver of vehicle 160, the officer's telephone unit 10 may be pointed at the vehicle and a direction finder activated. A distance estimate may be entered to create a time-based moving GZ# 20S about the vehicle 160 and call a telephone unit 10 in the vehicle. The GZ# 20S may be calculated as a "relative" location, that is, relative to the GZ# 20T of telephone unit 10 in the officer's vehicle 162. The officer's telephone unit 10 may include a range finder 112 which electronically supplies the desired distance for placement of the call. Once contact with a telephone unit 10 in the speeding car 160 is established, the telephone unit provides its own G# (not shown), which will be an "exact" location as compared to GZ# 20S. The velocity of car 160 is easily established by a computer calculation of car movement as a time function. If the police car and speeding vehicle are both moving (in any direction relative to each other), the time changes in G# and substantially continuously calculated direction of movement of each vehicle enables immediate calculation of the velocity of the speeding car by a vector program, without the use of a radar machine. This information may be recorded for subsequent use e.g. in prosecution.

Occasionally, it is necessary for an ambulance or other public safely vehicle 164 to meet a vehicle 166 carrying a person requiring immediate medical assistance. Using the continuously known locations G# 30Q and G# 30R and the calculated velocities of both vehicles 164, 166 together with actual road distances and driving conditions, vector analysis or other calculations will determine the time required to achieve meeting, using possible routes of each vehicle. The program provides a calculated best meeting point, and the ambulance 164 can direct vehicle 166 to a route providing the most expeditious location for meeting, so that the person may be pre-treated in the ambulance on the way to a medical center, for example. Thus, in FIG. 17, the ambulance 164 will travel Primary Route M in a direction 170 toward a medical center. Vehicle 166 will take Secondary Route N to its intersection 172 with Route M. Alternate routes of Vehicle 166 include Route S to Route M or T, Road R to Route T, or Road Q to Route M, but these will be calculated to take longer.

Furthermore, by indicating its route in an on-board computer or communication administrative system, the telephone unit 10 of the ambulance or other public safety vehicle 164 may be used to alert all other vehicles 168 in a GZ# 20V and 20W encompassing the routes of both vehicles 164, 166 respectively, in a sequential manner, indicating that they should pull over to permit the vehicle 164 through. In one embodiment, these forward progressing siren calls may activate the sound of a siren in the telephone units 10 within each of the other vehicles 168 as a GZ# 20V or 20W overtakes it. This forward progression GZ# system may be fine-tuned so that for example, only traffic moving in the same direction is warned, or the warning may include side traffic approaching the route.

In addition, traffic signals may be fitted with a sensor to detect transmitted instructions for changing the timing of the signals. For example, the cycle may be changed to provide green lights for the ambulance and/or other vehicle. These instructions are "forward-progressive", i.e. they precede the vehicle by sufficient time so that the vehicle need not stop or slow at intersections traffic signals. After the ambulance or other vehicle passes the intersection, the traffic signals are instructed by the vehicle's communications unit 10 to revert to normal operation. In this mode, the communications unit 10 provides a continuous or semi-continuous signal to the traffic signals, and may simultaneously warn other vehicles as discussed above. In one embodiment, the communications unit 10 defines a GZ which precedes the vehicle by for example 0.4 miles, sequentially aligning all traffic lights within the moving GZ 20 to the vehicle's path. Alternatively, signal lights may be changed to turn all lights red (stop), or other appropriate signal.

Similarly, traffic may be directed to avoid accident sites by the use of telephone units 10 or even by activating a connected map/navigation program in vehicles having such systems, e.g. OnStar™. Thus, all cars approaching a crash site may be warned and directed to an alternate route. The system may be expanded to provide real-time traffic reports specific to the route of travel and the location on that route.

In addition, of course, an entire safety administration body (police, sheriff's department, civil safety, etc.) may be simultaneously notified of a common message important to them, through use of assigned department prefix or suffix identification number in the GZ# 20.

In another example, when a city block, or an apartment building, or any area, needs to be warned, or evacuated, or otherwise informed of something of importance, a public safety officer may use a single GZ# 20 encompassing the area to immediately reach all phones specific to (within) the area; the message may be prerecorded, and is transmitted continuously to all phones in the GZ# 20, greatly reducing any delay in warning. In addition, the alarm will alert all phone units 10 in the identified GZ# 20.

It may be noted that for situations in which transmission may be difficult, within a steel building or area for example, a mini-cell specific to that building or area may be used. Thus, all telephone units 10 within the building may be interconnected via a local wireless system which identifies the current location (in three dimensions) within the building of any phone unit 10. In the event of a fire or other emergency for example, a fireman entering the building will have his location G# 30 known to outside personnel at all times.

In another concept useful for modern communication, each telephone unit 10 may be assigned a specific default language, e.g. English, German, Spanish, etc. by the owner/primary user. This default setting may be associated with the phone's billing number, i.e. identification number. Any message which is to be used by fire departments, police, etc. may be prerecorded in multiple languages. When any telephone unit 10 is activated to receive a particular message, e.g. by the fire department, it receives the message prerecorded in the default language preset for that telephone unit. Thus, a person responding to a message will receive it in his own tongue. A user may over-ride the default language and select another language, if desired. This feature is especially useful in multi-ethnic areas of any country, especially when warnings and evacuation orders are issued in the event of storms, fire, earthquake, criminal activity, etc. In addition, airplane pilots and navigators, as well as seagoing vessel personnel, may be able to select a language enabling clear understanding of emergency messages and the like.

In another embodiment, clubs or event personnel could communicate to all members, or any portion of their members, simultaneously. For example, in a cross-country bicycle race, all racers could be assigned a given GZ# prefix, suffix or other identifier enabling simultaneous communication to all or a certain number of the group. Optionally, for example, racers nearing the finish line will receive a special message. Team-mates will be enabled to communicate with each other. In this embodiment, persons of any group of people who wish to hold simultaneous conversation, or receive a common message, may all be assigned a particular identifying number. In another example, members of a fishing club may be assigned a specific identifier. When fishing in the ocean, a member may locate any or all other members fishing in any defined area, i.e. GZ# 20.

At this point, it should be noted that the telephone units 10 may include the option of self-answering, in which the unit is programmed to not only signal when it is called, but to answer the call. For example, a bicycle racer receiving a call need not physically touch the telephone unit 10, but merely listens to messages through an earphone, or optionally talks into an attached miniature microphone.

It should be noted that general messages relating to weather forecasts, storm warnings, road closings, traffic, or any other message of public importance may be accessed by a user. As already noted, a governmental safety office may specifically activate all phones 10 within a specific area or region with a warning. The activation program may include means for establishing an "interruption priority" enabling interruption of existing conversations.

For example, all phones 10 within a 100 mile-long expected path of a tornado or hurricane, or along a river subjected to a flash flood, may be activated with a warning.

Use of a GZ# prefix/suffix would also be useful in tracking and surveillance. For example, animals fitted with telephone units 10 may be accessed by dialing a particular number to determine its exact location. The telephone unit 10 may receive information from any measurement device to relay for example pulse rate, body temperature, and the like. An automatic dialer, either on the roaming unit 10 or on the base station unit, may be set to gather information at any desired time or time interval.

Such a system could also be placed in a vehicle, by which its location could be determined at any time.

Use of this system 50 is indicated in any situation where knowledge of a person's location G# 30 is important, such as in forest fire control. This and other embodiments described below may be subject to high restriction to use by court order or other official action.

In another embodiment of the invention, each telephone unit 10 is provided with a "serial number" specific to that unit. In the event a unit is stolen, the exact location or relative location of the unit may be determined from another phone unit by initiating a call to a large GZ# 20 encompassing the area of loss, and including both of the "serial number" and the phone unit's billing number (conventional phone number) in the called number The called unit will respond with its exact location (G# 30).

Whether the location based system 50 uses communications satellites, cellular towers or wire/optic signals, the location based communications system 50 transmits a call to a specified GZ# 20 and records the G# 30 when a telephone unit responds. The called number may include a specific identification number (serial number or phone number) by which only a single phone unit 10 may respond. The programs of the calling and called units 10 may be configured to permit a called telephone unit to respond with its location, ID number, and/or other information, without indicating to the called party that such a call has been received and responded to. In this embodiment, a party may be tracked automatically by another telephone unit 10, a feature useful for law enforcement, search-and-rescue teams, aircraft traffic control, etc. A tracking telephone unit 10 may be provided with a detector to confirm that the person being tracked is present. It may also be used to estimate current traffic intensity, as well as vehicle velocities (specific vehicles and average velocity) on specific highway locations for example.

In another advantage of the invention, it is noted that if a phone unit 10 is misplaced or lost by its user in an area not likely to have other phone units, it may be located by calling, from another phone, a GZ# 20 sufficiently large to encompass the area and activate the lost unit. The lost unit 10 then responds by indicating its exact location G# 30.

It is also evident that the system 50 may be configured so that the location G# 30 of a lost/stolen telephone unit 10 may be determined simply by calling the billing number of the unit.

In another use, a delivery company may use a G# 30 to indicate a receiving address. An electronic map on the vehicle will indicate the location, as well as the street address and G# 30. Such maps are currently available and may comprise a portion of the memory of a telephone unit 10.

As in the current "Yellow Pages" of Bell Telephone affiliates, the location based communication system 50 enables placement of advertising/informational information available to anyone with a telephone unit 10. In one embodiment, each type of business will be assigned a particular "Yellow Pages" code identifier. To exemplify, a travelling person in need of a motel may call a GZ# encompassing the next 15 miles of the highway, and including the identifier number for lodging. He will receive a message indicating the particular lodging sites in the next 15 miles together with information such as location, price, phone number, availability of rooms, distance off the road, etc.

In another example, using a different identifier number, the closest or next gasoline station(s) on the traveler's route may be identified for a vehicle in need of fuel. Local information may be provided by special programming of a high-memory coded telephone unit 10 within the area of interest, callable from any other telephone unit.

In the communications system 50 of the invention, a telephone unit 10 may communicate with another telephone anywhere on the earth or in airspace above the earth's surface 25 via a communications satellite transceiver, without the need for an intermediate gateway 54. In a hybrid system, however, large numbers of stationary telephone units 10 may continue to use gateways. In addition, mobile cellular telephone units may also continue to use cellular base stations along with satellite gateway stations 54 to gain access to the location based communications system 50. As described, the location based communications system 50 is particularly useful for special purposes including law enforcement, rescue, aircraft traffic control, tracking and the like.

In another embodiment of the invention, a location based communications system 50 is configured to be used underwater, whereby the communication is via ultrasonic or other wavelength sonic transmission. The communications system enhances the capabilities for commercial, pleasure and navy diving, and enhance safety thereof. Use in underwater rescue scenarios is advantageous.

Many other modifications and embodiments of the invention will come to the mind of one skilled in the art having the benefit of the teachings presented in the foregoing descriptions and the associated drawings. Therefore, it is to be understood that the invention is not limited to the specific embodiments disclosed, and that other modifications and embodiments are intended to be included within the scope of the invention, in accordance with the following claims and equivalents thereof.

I claim:

1. A communication system for communication between a first communications unit and at least one other communications unit, comprising:
    first communications unit, comprising:
        radio-telephone means for sending and receiving messages by radio including means for initiating, maintaining and terminating said messages;
        means for receiving encoded earth locations of itself in at least two dimensions from a Position Locating Satellite;
        means for encodingly defining a selectable geographic zone having boundaries encoded in at least two dimensions to seek connection with a targeted communications unit;
        means for initiating a radio call in said selected geographic zone, said radio call including a code of said selected zone; and
    second communications unit, comprising:
        radio-telephone means for sending and receiving messages by radio including means for initiating, maintaining and terminating said messages;
        means for receiving encoded earth locations of itself in at least two dimensions from a Position Locating Satellite;
        means for encodingly defining a selectable geographic zone having boundaries encoded in at least two dimensions to seek connection with a targeted communications unit;
        means for comparing said geographic zone selected by said first communications unit with said encoded earth location of itself to determine agreement therewith, and
        means for responding to said radio call when said encoded earth location of itself is encompassed by said selected geographic zone.

2. A communications system in accordance with claim 1, wherein said selected geographic zone is selectable in at least two of location, size, and shape.

3. A communications system in accordance with claim 1, wherein said selected geographic zone is selectable in coordinates of latitude and longitude with a default vertical value.

4. A communications system in accordance with claim 3, wherein said geographic zone is two-dimensional with a shape of one of full circle, partial circle, full ellipse, partial ellipse, and polygon definable in two dimensions.

5. A communications system in accordance with claim 1, wherein said selected geographic zone is selectable in coordinates of latitude, longitude and elevation.

6. A communications system in accordance with claim 5, wherein said selected geographic zone is three-dimensional with a shape of one of a cube, sphere, pyramid, cylinder, ellipsoid and polyhedron.

7. A communications system in accordance with claim 5, wherein said elevation is the height above sea level.

8. A communications system in accordance with claim 5, wherein said elevation is the height above ground level of solid land and above water level of water bodies.

9. A communications system in accordance with claim 5, wherein said elevation comprises an axial dimension from the center of the earth.

10. A communications system in accordance with claim 1, further comprising means for setting a standard combination of size and shape of geographic zone relative to one of a selectable location and said first communications unit.

11. A communications system in accordance with claim 1, further comprising means for progressively increasing the size of said geographic zone in at least one dimension when there is no radio response to said call within the last previous said geographic zone.

12. A communications system in accordance with claim 11, wherein said geographic zone stops increasing when a radio response to said call is received by said first communications unit.

13. A communications system in accordance with claim 1, further comprising means for progressively decreasing the size of said geographic zone in at least one dimension to discriminate between a plurality of radio responses to said call.

14. A communications system in accordance with claim 1, wherein said first and second communications units of said system are equivalent.

15. A communications system in accordance with claim 1, wherein said call and said response comprise at least one of digital and voice.

16. A communication system in accordance with claim 1, wherein said call and said response are relayed through an intermediary processing unit.

17. A communication system in accordance with claim 16, wherein said intermediary processing unit comprises at least one of a system of communications satellites and a cellular telephone system.

18. A communications system in accordance with claim 1, wherein said radio-telephone means comprises:
    digital memory for storage and retrieval of data and operating settings;
    an RF transmitter with antenna for initiating and transmitting, radio calls to an intermediary processing unit;
    an RF receiver with antenna for receiving radio calls from said intermediary processing unit;
    a radio receiver with antenna for receiving signals from a global positioning satellite indicating the position of said radio receiver;
    a keyboard;
    a display;
    a modulator;

a demodulator;
a keyboard actuated controller;
controller memory; and
power supply means.

19. A communications system in accordance with claim 1, wherein said communications units are at least one of stationary telephones, portable telephones, installed in a moveable vehicle, installed in a computer, and installed in a telephone-controlled machine.

20. A communications system in accordance with claim 1, wherein said communications unit includes means for communication by conventional telephone systems and cellular phone systems.

21. A communications system in accordance with claim 1, wherein said communications unit includes means for one of continuously and periodically relaying its specific earth location to said intermediary processing system.

22. A communications system in accordance with claim 1, wherein said second communications unit comprises a plurality of communication units.

23. A communications system in accordance with claim 22, wherein said communications units in said plurality are configured with priority codes for responding to a call.

24. A communications system in accordance with claim 1, wherein said first communications unit further includes user controllable means for determining a geographic zone of an object associated with a second communications unit, said user controllable means comprising:
an activatable direction finder; and
a distance selector for entering an estimated distance to said object;
wherein alignment and activation of said direction finder with a direction of one of sight and sound establishes a direction from said first communications unit, and selection of an estimated distance provides an estimated geographic zone location of said called second communications unit.

25. A communications system in accordance with claim 24, further comprising means for selecting a shape and size of said geographic zone.

26. A communications system in accordance with claim 24, wherein said selectable size is a default size dependent on the selected estimated distance.

27. A communications system in accordance with claim 24, wherein at least one of said zone shape and said zone size is user-selectable.

28. A communications system in accordance with claim 1, wherein said call is initiated by a call string comprising at least one of numeric and alphanumeric codes including:
an identifying number (ID) of said first communications unit;
the geographic location of said first communications unit;
one of a geographic location and a geographic zone surrounding a second communication unit to be called; and
a call initiating code.

29. A communications system in accordance with claim 28, further comprising at least one of an encoded indication of an identifying number (ID) of said first and second communication unit and an encoded indication of said unit's designated primary use including one of law enforcement, medical personnel, hazardous response team, aircraft, water vessel, air control team, and group membership, wherein all communication units of said encoded indication respond to said encoded indication.

30. A communications system in accordance with claim 28, further comprising an encoded indicator to initiate an alarm on a called communications unit.

31. A communications system in accordance with claim 28, further comprising means for programming combinations of encoded indications in pre-set calling buttons for placing calls with a single finger movement.

* * * * *